US009256862B2

(12) United States Patent
Lai et al.

(10) Patent No.: US 9,256,862 B2
(45) Date of Patent: Feb. 9, 2016

(54) MULTI-TIERED APPROACH TO E-MAIL PRIORITIZATION

(75) Inventors: Jennifer C. Lai, Garrison, NY (US); Jie Lu, Hawthorne, NY (US); Shimei Pan, Armonk, NY (US); Zhen Wen, Springfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 13/528,598

(22) Filed: Jun. 20, 2012

(65) Prior Publication Data

US 2013/0339276 A1    Dec. 19, 2013

Related U.S. Application Data

(63) Continuation of application No. 13/525,173, filed on Jun. 15, 2012, now Pat. No. 9,152,953.

(51) Int. Cl.
*G06F 15/18* (2006.01)
*G06Q 10/10* (2012.01)

(52) U.S. Cl.
CPC .................................. *G06Q 10/107* (2013.01)

(58) Field of Classification Search
CPC ... H04L 13/585; H04L 51/12; H04L 63/0245; G06F 17/30011; G06F 17/30867
See application file for complete search history.

(56) References Cited

U.S. PATENT DOCUMENTS

| | | | |
|---|---|---|---|
| 7,089,241 B1* | 8/2006 | Alspector et al. | |
| 7,222,158 B2* | 5/2007 | Wexelblat | 709/206 |
| 7,320,020 B2* | 1/2008 | Chadwick et al. | 709/206 |
| 7,509,381 B1* | 3/2009 | Hutchinson et al. | 709/206 |
| 7,580,982 B2* | 8/2009 | Owen et al. | 709/206 |
| 7,680,890 B1* | 3/2010 | Lin | 709/206 |
| 7,747,691 B2* | 6/2010 | Castell et al. | 709/206 |

(Continued)

FOREIGN PATENT DOCUMENTS

| | | |
|---|---|---|
| CN | 1704960 A | 12/2005 |
| CN | 1742266 A | 3/2006 |
| CN | 101911067 A | 12/2010 |

OTHER PUBLICATIONS

Segal, "Combining Global and Personal Anti-Spam Filtering", 2007, In Proceed of the Fourth Conference on Email and Anti-Spam, pp. 1-8.*

(Continued)

*Primary Examiner* — Jeffrey A Gaffin
*Assistant Examiner* — Paulinho E Smith
(74) *Attorney, Agent, or Firm* — Anne V. Dougherty, Esq.; McGinn IP Law Group, PLLC

(57) ABSTRACT

A method of automating incoming message prioritization. The method including training a global classifier of a computer system using training data. Dynamically training a user-specific classifier of the computer system based on a plurality of feedback instances. Inferring a topic of the incoming message received by the computer system based on a topic-based user model. Computing a plurality of contextual features of the incoming message. Determining a priority classification strategy for assigning a priority level to the incoming message based on the computed contextual features of the incoming message and a weighted combination of the global classifier and the user specific classifier. Classifying the incoming message based on the priority classification strategy.

14 Claims, 13 Drawing Sheets

(56) References Cited

U.S. PATENT DOCUMENTS

| | | | |
|---|---|---|---|
| 7,899,866 B1* | 3/2011 | Buckingham et al. | 709/206 |
| 7,899,871 B1* | 3/2011 | Kumar et al. | 709/206 |
| 7,904,399 B2* | 3/2011 | Subramaniam et al. | 706/20 |
| 8,082,306 B2* | 12/2011 | Maresh et al. | 709/206 |
| 8,095,613 B1* | 1/2012 | Perkowitz et al. | 709/207 |
| 8,214,437 B1* | 7/2012 | Alspector et al. | 709/206 |
| 8,745,143 B2* | 6/2014 | Vitaldevara et al. | 709/206 |
| 8,799,387 B2* | 8/2014 | Alspector et al. | 709/206 |
| 2002/0022956 A1* | 2/2002 | Ukrainczyk et al. | 704/9 |
| 2002/0132607 A1* | 9/2002 | Castell et al. | 455/412 |
| 2003/0130993 A1* | 7/2003 | Mendelevitch et al. | 707/3 |
| 2003/0167267 A1* | 9/2003 | Kawatani | 707/6 |
| 2004/0148330 A1* | 7/2004 | Alspector et al. | 709/200 |
| 2004/0167964 A1* | 8/2004 | Rounthwaite et al. | 709/206 |
| 2004/0267893 A1* | 12/2004 | Lin | 709/207 |
| 2005/0015626 A1* | 1/2005 | Chasin | 713/201 |
| 2005/0144279 A1* | 6/2005 | Wexelblat | 709/225 |
| 2005/0267944 A1* | 12/2005 | Little | 709/207 |
| 2006/0143175 A1* | 6/2006 | Ukrainczyk et al. | 707/6 |
| 2006/0190481 A1* | 8/2006 | Alspector et al. | 707/103 R |
| 2008/0133682 A1* | 6/2008 | Chadwick et al. | 709/206 |
| 2008/0208840 A1* | 8/2008 | Zhang et al. | 707/5 |
| 2008/0306972 A1* | 12/2008 | Wilkin et al. | 707/100 |
| 2009/0013052 A1 | 1/2009 | Robarts et al. | |
| 2009/0030989 A1* | 1/2009 | Maresh et al. | 709/206 |
| 2009/0287618 A1* | 11/2009 | Weinberger et al. | 706/10 |
| 2009/0327430 A1* | 12/2009 | Colvin et al. | 709/206 |
| 2010/0030798 A1* | 2/2010 | Kumar et al. | 707/102 |
| 2010/0161611 A1* | 6/2010 | Guo et al. | 707/738 |
| 2010/0191819 A1* | 7/2010 | Alspector et al. | 709/206 |
| 2010/0211641 A1* | 8/2010 | Yih et al. | 709/206 |
| 2010/0211644 A1* | 8/2010 | Lavoie et al. | 709/206 |
| 2010/0223670 A1* | 9/2010 | Castell et al. | 726/24 |
| 2010/0280981 A1 | 11/2010 | Kato et al. | |
| 2011/0029472 A1* | 2/2011 | Lai et al. | 706/47 |
| 2011/0119264 A1* | 5/2011 | Hu et al. | 707/728 |
| 2011/0178962 A1* | 7/2011 | Sood | 706/11 |
| 2011/0196875 A1* | 8/2011 | Vadlamani et al. | 707/748 |
| 2011/0270845 A1* | 11/2011 | Lin et al. | 707/748 |
| 2011/0295781 A1* | 12/2011 | Tyson et al. | 706/12 |
| 2012/0078834 A1* | 3/2012 | Sainath et al. | 706/50 |
| 2012/0095952 A1* | 4/2012 | Archambeau et al. | 706/52 |
| 2012/0101965 A1* | 4/2012 | Hennig et al. | 706/12 |
| 2012/0102130 A1* | 4/2012 | Guyot et al. | 709/206 |
| 2012/0209871 A1* | 8/2012 | Lai et al. | 707/769 |
| 2012/0245925 A1* | 9/2012 | Guha et al. | 704/9 |
| 2012/0303717 A1* | 11/2012 | Guo et al. | 709/205 |
| 2013/0007152 A1* | 1/2013 | Alspector et al. | 709/206 |
| 2013/0325972 A1* | 12/2013 | Boston et al. | 709/206 |
| 2013/0339276 A1* | 12/2013 | Lai et al. | 706/12 |
| 2014/0101086 A1* | 4/2014 | Lu et al. | 706/46 |

OTHER PUBLICATIONS

International Search Report dated Jul. 18, 2013.
Aberdeen, D., Pacovsky, O., & Slater, A. The learning behind Gmail Priority Inbox. In *NIPS 2010 Workshop on Learning on Cores, Clusters and Clouds*.
Blei, D., Ng, A., & Jordan, M. Latent dirichlet allocation. *Journal of Machine Learning Research*, 3:993-1022, 2003.
Dabbish, L., & Kraut, R. Email overload at work: an analysis of factors associated with email strain. In *CSCW 2006*.
Dabbish, L., Kraut, R., Fussell, S., & Kiesler, S. To reply or not to reply: predicting action on an email message. In *Analysis 2004*.
Dabbish, L., Kraut, R., Fussell, S., & Kiesler, S. Understanding email use: predicting action on a message. In *CHI 2005*.
Dredze, M., Brooks, T., Carroll, J., Magarick, J., Blitzer, J., & Pereira, F. Intelligent email: reply and attachment prediction. In *IUI 2008*.
Faulring, A., Myers, B., Mohnkern, K., Schmerl, B., Steinfeld, A., Zimmerman, J., Smailagic, A., Hansen, J., & Siewiorek, D. Agent-assisted task management that reduces email overload. In *IUI 2010*.
Horvitz, E., Jacobs, A., & Hovel, D. Attention-sensitive alerting. In *UAI 1999*.
Karagiannis, T. & Vojnovic, M. Behavioral profiles for advanced email features. In *WWW 2009*.
Kerr, B. & Wilcox, E. Designing REMAIL: reinventing the email client through innovation and integration. In *CHI 2004*.
Lockerd, A. Understanding implicit social context in electronic communication. MIT Master's Thesis.
Lu, J., Pan. S., Lai, J., & Wen, Z. Information at your fingertips: contextual IR in enterprise email. In *IUI 2011*.
Neustaedter C., Brush, A., Smith, M., & Fisher, D. The social network and relationship finder: social sorting for email triage. In *CEAS 2005*.
Siu, N., Iverson, L., & Tang, A. Going with the flow: email awareness and task management. In *CSCW 2006*.
Song, Y., Pan, S., Liu, S., Zhou, M. & Qian, W. Topic and keyword re-ranking for LDA-based topic modeling. In *CIKM 2007*.
Venolia, G., Dabbish, L., Cadiz, J., & Gupta, A. Supporting email workflow. MSR Tech Report MSRTR-2001-88.
Venolia, G. & Neustaedter, C. Understanding sequence and reply relationships within email conversations: a mixed-model visualization. In *CHI 2003*.
Wainer J., Dabbish, L., & Kraut, R. Should I open this email?: inbox-level cues, curiosity and attention to email. In *CHI 2011*.
Yang, Y., Yoo S., & Lin, Frank. Personalized email prioritization based on content and social network analysis. *IEEE Intelligent Systems*, 25(4):12–18, 2010.
United States Office Action dated Sep. 16, 2014 in U.S. Appl. No. 13/525,173.
United States Office Action dated Jan. 15, 2015 in U.S. Appl. No. 13/525,173.

* cited by examiner

MULTI-TIERED APPROACH TO E-MAIL PRIORITIZATION

CROSS-REFERENCE TO RELATED APPLICATION

The present application is a continuation application of U.S. application Ser. No. 13/525,173, filed on Jun. 15, 2012, now U.S. Pat. No. 9,152,953 the entire contents of which are incorporated herein by reference.

BACKGROUND OF THE INVENTION

1. Field of the Invention

The present invention generally relates to a method and apparatus for the prioritization of E-mail messages, and more particularly to a method and apparatus for a multi-tiered approach to the prioritization of E-mail messages.

2. Description of the Related Art

Given the large number of messages that are received each day by knowledge workers and the amount of time required to read and respond to each message, knowledge workers often seek to optimize the time spent on message processing by scanning their inbox, checking sender names and subjects in order to prioritize some messages for attention over others. When the number of new messages in a knowledge worker's inbox is large, sifting through the messages to identify high-priority messages quickly becomes a non-trivial and time-consuming task by itself. This non-trivial and time-consuming task results in a daily feeling of "email overload" and occasionally results in the unfortunate result of overlooking key messages since people find it difficult to create an efficient order when sorting based on elements such as sender, subject, or date.

It is generally understood that the action that a user takes on a message, e.g., read, reply, file or delete, largely depends on the user-perceived importance of the message. The main goal of email prioritization is thus to identify email messages with a high value of user-perceived importance.

There have been several proposed or suggested techniques for redesigning email interfaces to help users quickly identify important emails in their inbox. For example, existing approaches mostly prioritize emails based on a classifier that is trained using supervised learning algorithms.

For example, some conventional approaches automatically group emails into conversational threads and prioritizes messages based on linear logistic regression models with a variety of social, content, thread, and label features to prioritize users' incoming messages. Other conventional approaches use Support Vector Machine (SVM) classifiers, over word-based, phrase-based, and meta-level features, e.g., message sender, recipients, length, time, presence of attachments, to determine the importance of new unread emails. Still other conventional approaches use SVM classifiers, but with additional social importance features computed based on each user's personal social network derived from email data. The content-based features used by these approaches for classifier learning are words that occur in email content, which may not work well for very brief messages with too few words (sparse data) or long messages with too many words (noisy data).

For instance, conventional technologies train their classifier by looking at all of the words within the body of a message. This approach results in a highly dimensional classification, because each word is a dimension. Some conventional classifiers use this highly dimensional approach and then try to infer the importance of the message by calculating the number of instances that a particular word or words appear, while other conventional classifiers attempt to predict the importance of a message based on the location of one word relative to the location of another word. These approaches are very noisy due to their highly dimensional nature. As a result, it is very difficult for a user to ascertain why seemingly similar messages are classified differently by systems that employ conventional approaches.

To increase the accuracy of the prioritization, some conventional approaches train a classifier through one-time batch processing of labeled training data and either do not consider dynamic user feedback, or simply use user feedback to incrementally update the feature weights of the classifier. For example, in conventional technologies that provide for user feedback, the feedback is merely folded into the classifier, which simply adjusts the existing weight of the classifier. However, since the classifier is only updated for each specific feedback instance, it is possible that this feedback is not reflected instantly in the classifier, e.g., even after a user indicates that a message from a sender is low priority, he may still get messages from that sender marked as high priority. In other words, it may take time for the weight of the classifier to be updated in a meaningful manner, e.g., in a manner that would cause the system to change the predicted priority of the message.

Furthermore, aggressively updating feature weights based on user feedback reduces the robustness of email prioritization, e.g., sacrifices the reliability provided by the classifier, while conservatively updating feature weights results in a slow response to user feedback.

Accordingly, the present inventors have recognized a need for improved email systems and methods that assist the user in his/her daily triage of incoming messages by quickly incorporating user-specific criteria for determining the priority of a received email message without sacrificing the reliability provided by the global (general) classifier.

SUMMARY OF THE INVENTION

In view of the foregoing and other exemplary problems, drawbacks, and disadvantages of the conventional methods and structures, an exemplary feature of the present invention is to provide a method and structure in which email prioritization is informed by a topic-based user model automatically built from a user's email data and relevant enterprise information, e.g., organizational structure.

In a first exemplary aspect of the present invention, the global classifier helps alleviate the cold start problem and improve the robustness of priority prediction, while the user-specific classifier increases the system's adaptability and enables quick response to user feedback.

In another exemplary aspect of the present invention, the user model, the message metadata and the message content are used to compute contextual features as input to priority classifiers.

In another exemplary aspect of the present invention, dynamic strategies to combine the global priority classifier and the user specific classifier are provided.

According to another exemplary aspect of the present invention, an apparatus is provided. The apparatus includes an input to receive an incoming message; at least one processor; and a memory tangibly embodying a set of instructions for automating a prioritization of the incoming message. The instructions include a batch learning module that generates a global classifier based on training data that is input to the batch learning module; a feedback learning module that generates a user-specific classifier based on a plurality of feedback instances; a feature extraction module that receives the incoming message and a topic-based user model, infers a topic of the incoming message based on the topic-based user model, and computes a plurality of contextual features of the incoming message; and a classification module that dynamically determines a priority classification strategy for assigning a priority level to the incoming message based on the plurality of contextual features of the incoming message and a weighted combination of the global classifier and the user specific classifier, and classifies the incoming message based on the priority classification strategy.

According to another exemplary aspect of the present invention, a computer system comprising a memory tangibly embodying a set of instructions for automating a prioritization of an incoming message, is provided. The instructions causing the computer system to comprise: a plurality of classifiers comprising: a global classifier that is created with training data; and a user-specific classifier that is dynamically updated based on a feedback instance; a topic-based user model comprising a plurality of topic models; a feature extraction module that infers a topic of the incoming message and computes a plurality of contextual features of the incoming message based on the inferred topic of the incoming message; and a classification module that assigns a weight to each contextual feature of the plurality of contextual features based on a dynamic combination of the global classifier and the user specific classifier, combines the assigned weight of each contextual feature, and determines a priority level of the incoming message.

According to another exemplary aspect of the present invention, a computer system for automating a prioritization of an incoming message, is provided. The computer system comprising: a plurality of classifiers comprising: a global classifier that is created with training data; and a user-specific classifier that is dynamically updated based on a feedback instance; a topic-based user model comprising a plurality of topic models; a feature extraction module that infers a topic of the incoming message and computes a plurality of contextual features of the incoming message based on the inferred topic of the incoming message; and a classification module that assigns a weight to a set of contextual features of the plurality of contextual features based on a dynamic combination of the global classifier and the user specific classifier, combines the assigned weight of the set of contextual features, and determines a priority level of the incoming message. According to another exemplary aspect of the present invention, an apparatus is provided. The apparatus, comprising: an input to receive an incoming message; at least one processor; and a memory tangibly embodying a set of instructions for automating a prioritization of the incoming message. The instructions causing the apparatus to comprise: a feature extraction module that infers a topic of the incoming message based on a topic-based user model, and computes a plurality of contextual features of the incoming message based on the inferred topic of the incoming message; and a classification module that assigns a weight to the plurality of contextual features based on a dynamic combination of a plurality of classifiers and dynamically determines a priority classification strategy for assigning a priority level to the incoming message based on a combination of the assigned weight of the contextual features.

A computer-readable storage medium according to yet another aspect of the present invention includes a computer-readable storage medium storing a program for causing a computer to execute a method for a multi-tiered approach to email prioritization.

A computer-readable storage medium according to yet another aspect of the present invention includes a computer-readable storage medium storing a program for causing a computer to function as the above device for a multi-tiered approach to email prioritization.

According to the present invention instance-based matching between a new message and previous messages for which feedback has been provided are used to dynamically determine the best strategy to combine the global classifier and the user-specific classifier. This approach allows the present invention to quickly incorporate user-specific criteria for determining the priority of a received email message without sacrificing the reliability provided by the global classifier.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
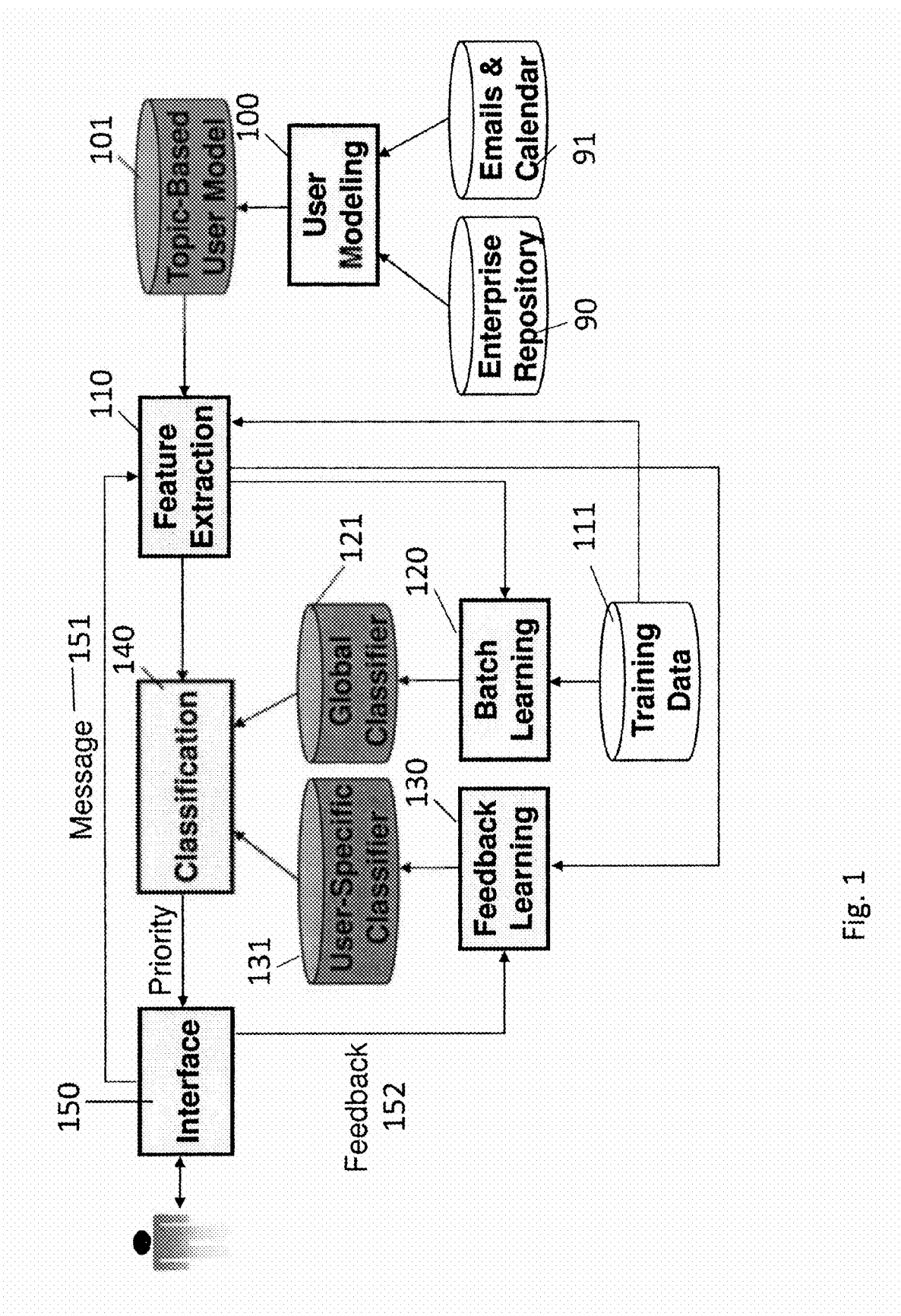
FIG. 1 illustrates the system architecture of an exemplary embodiment of the present invention.

Referring now to the drawings, and more particularly to FIGS. 1-13, there are shown exemplary embodiments of the method and structures according to the present invention.

The present invention provides a multi-tiered approach to email prioritization. The present invention automatically identifies high-priority emails in a user's inbox. According to one aspect of the invention, the disclosed methods and systems display, in a graphical user interface (GUI), the high-priority emails in a separate section from other email. These features alone or in combination assist a user in his/her daily triage of incoming messages.

As described herein, the prioritization of incoming emails is informed by a user model, e.g., a topic-based user model, which is automatically created from, for example, the user's email data along with relevant enterprise information, e.g. an organizational structure. Upon receipt of an incoming message, the present invention computes the values of a set of contextual features using information that is included in the topic-based user model in conjunction with metadata and the content of the received message. Based on these contextual features, the present invention then determines the priority of the incoming/received message using a multi-tiered approach.

According to one aspect of the present invention, the multi-tiered approach dynamically determines how to combine a global priority classifier (established from labeled training data of multiple users) with a user-specific classifier built from ongoing user feedback to achieve a balance between robustness and responsiveness. For example, the present invention provides a multi-tiered approach to priority classification of incoming messages by dynamically determining a best strategy to combine the global classifier and the user-specific classifier. This strategy may be based on, for example, instance matching between a new message and messages for which the system has received explicit and/or implicit priority feedback.

According to another aspect of the present invention, a set of contextual features, are derived from each message based on a topic-based user model. As described herein, this topic-based user model encodes granular information, (e.g., information about the user's interaction with different people on different topics, each topic's degree of importance to the user, and the user's relationship, e.g., direct-report, team member, non-team member, with each of the user's email contacts in an enterprise environment). Further, as described herein, the present invention implements a multi-tiered approach to priority classification. For example, as opposed to conventional technologies that simply combine a global classifier and a user-specific classifier with fixed weights, the present invention uses instance-based matching between a new message and messages for which feedback was previously provided to dynamically determine the best strategy to combine the global classifier and the user-specific classifier. This approach allows the present invention to quickly incorporate user-specific criteria for determining the priority of a received email message without sacrificing the reliability provided by the global classifier.

FIG. 1 shows an exemplary system architecture which includes five main modules. The user modeling module 100, the feature extraction module 110, the batch learning module 120, the feedback learning module 130, and the classification module 140. Preferably the interface 150 includes a graphical user interface (GUI).

The user modeling module 100 creates a topic-based user model 101 to encode information about the user's interaction behaviors and relationship with each sender of a message to the user. More specifically, in an exemplary embodiment, the user modeling module 100 receives as an input, data from the user's email and calendar content 91 and data from the enterprise repository 90. The user modeling module 100 then creates the topic-based user model 101, which contains encoded information such as a user's interaction behaviors with his/her contacts through emails, what topics they discuss, and the type and strength of their relationship within the enterprise.

The feature extraction module 110 receives either the incoming messages 151 (for prioritization or processing user feedback) or the training data 111 (for creating the global classifier 121), and the topic-based user model 101 as inputs, and computes the values of a set of contextual features for each message. These contextual features describe the context associated with a message 151 or a message in the training data 111, including interaction and relationship information associated with the email sender (retrieved from the topic-based user model 101), and characteristics of the message that are deemed as influencing user-perceived message importance. The feature extraction module 110 then outputs the contextual features of the message to the batch learning module 120, the feedback learning module 130 and the classification module 140.

The hatch learning module 120 creates a global priority classifier 121 using supervised learning based on training data 111. In particular, the batch learning module 120 calls the feature extraction module 110 to extract contextual features from the training data 111.

The feedback learning module 130 receives as input feedback 152 from the interface 150 about the priority of individual messages 151, and analyzes these messages 151 to create a user-specific classifier 131. In particular, the contextual features of a message 151 are input into the feedback learning module 130 via the feature extraction module 110.

The classification module 140 determines the priority of a message 151 based on a multi-tiered approach to priority classification of the message 151. Specifically, the classification module dynamically combines the global classifier 121 and the user-specific classifier 131. Meanwhile, the classification module 140, also receives contextual features extracted from the message 151 by the feature extraction module 110, based on the particular topic models of the topic-based user model 101. Based on the dynamic combination of the global classifier 121 and the user-specific classifier 131, the classification module 140 assigns a weight to each contextual feature of the message 151, or to a particular set of contextual features of the message 151, in another embodiment. Based on a combined result of the user-specific classifier 131 and the global classifier 121 the classification module 140 combines the weighted values of the contextual features of the message 151 and then determines a priority of the message 151 based this multi-tiered classification approach. Preferably, a binary classification of the message 151 is preformed, e.g., either high priority or low priority. However, additional categories of priority may be calculated based on the data input to the classification module 140.

The global classifier 121 and the user-specific classifier 131 may either be stored remotely, e.g., on a server, or locally on the users machine. In a preferred embodiment, the prioritization process occurs on a server before the message is ever delivered to the user. This allows the relatively computationally intensive prioritization classification to occur before the message 151 is even received by the user. This feature allows the user's machine to allocate valuable resources to processes other than the priority classification of incoming messages 151.

User Interface

Figure 2:
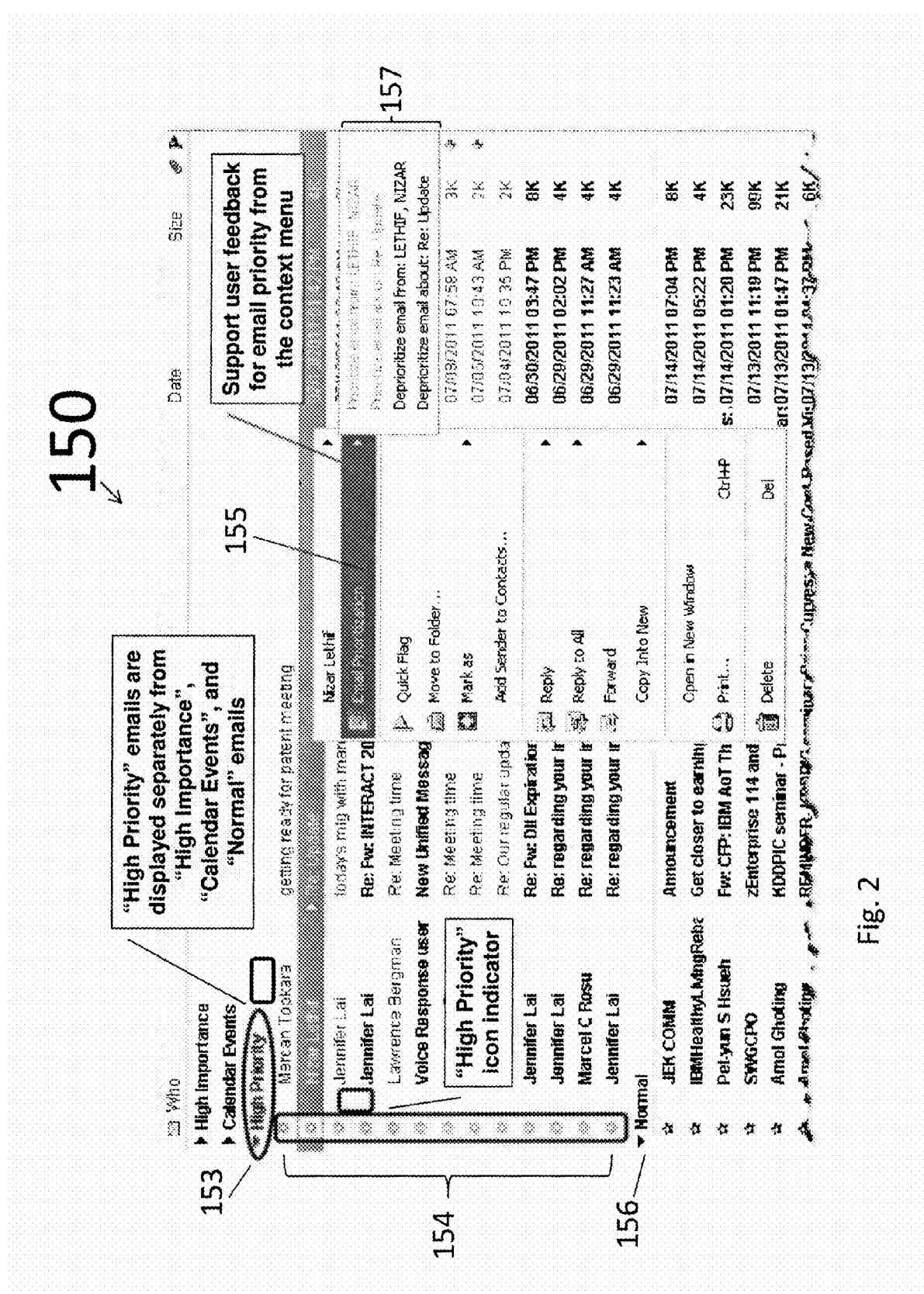
FIG. 2 illustrates an exemplary Graphical User Interface of the present invention.

Referring to FIG. 2, which shown an exemplary embodiment of the interface 150, it can be seen that in an exemplary embodiment of the present invention a "high priority" category 153 is provided. The exemplary embodiment of present invention allows messages 151 that are automatically classified as "high priority" to be populated within the "high priority" category 153. Similarly, as can be seen in FIG. 2, the exemplary embodiment of present invention allows messages 151 within the "high priority" category 153 to be marked as such with a "high priority" icon indicator 154. This feature allows messages 151 within the "high priority" category 153 to be displayed even when a user chooses a sort-ordered view instead of a grouped view. Therefore, the user can still easily identify messages 151 within the "high priority" category 153 based on the "high priority" icon indicator 154.

Conventional technologies merely have a "high importance" icon, typically denoted as an exclamation mark. The addition of the "high priority" category 153 and the "high priority" icon 154 may seem redundant at first until one realizes that the messages with a "high importance" icon are marked as 'urgent' by the sender. This does not necessarily mean they are of high priority to the receiver. Quite to the contrary, these messages often linger unread once the receiver sees that they are from a support person about a calendar event that is still weeks away, or from other administrative staff that want forms completed or updated.

To support user feedback, in an exemplary aspect of an exemplary embodiment of the present invention, an email prioritization menu item is preferably provided to the context menu 155, which is generally triggered when, for example, a user right mouse buttons down on a message 151 highlighted in the inbox view of the interface 150. With this exemplary aspect of the present invention, the user can indicate to the system to de-prioritize a message 151 within the "high-priority" category 153 or to prioritize a message currently in the "normal" category 156 while supplying the reason 157 for such de-prioritization or prioritization, e.g. whether it is because of the sender or the subject of the message.

Topic-Based User Model

Referring back to FIG. 1, an exemplary embodiment of the present invention preferably creates a topic-based user model 101 for each user. Preferably the topic-based user model 101 for each user is stored on a server. By storing the topic-based user model 101 on a server, the user may change computers without having to transplant his topic-based user model 101, which would otherwise be stored on their computer locally. If transplantation of the topic-based user model 101 is not performed when the user changes computers, then it may be necessary for the user to create new topic-based user model 101, when the user model is stored locally, as opposed to on a server.

The topic-based user model 101 encodes information based on characteristics that are influential on the user's assessment of message importance. The interaction history and the relationship of the sender and user/receiver are two characteristics that have been shown to be influential of the user's assessment of the importance of a message 151. An exemplary embodiment of the present invention extends the multi-tiered topic-based user model of conventional technologies and records finer-grained information about the user's behaviors in his/her interactions with different people/senders, and the user's relationships with them in an enterprise environment.

In an exemplary embodiment of the present invention, the topic-based user model comprises two data structures, (1) interaction data and (2) relationship data.

Interaction Data of the Topic-Based User Model

Interaction data comprises a set of messages exchanged between the user and the particular sender (sent to and copied on), a statistical topic model is generated from the aggregate content of this set of messages, and relevant statistics are derived from a combination of the set of messages and associated user actions.

For example, the following statistics may be recorded in an interaction between the user and the sender: (1) incoming_count: the number of incoming messages from this person; (2) outgoing_count: the number of outgoing messages to this person; (3) read_count: the number of incoming messages from this person that have been read by the user; (4) reply_count: the number of incoming messages from this person that have been replied by the user; (5) reply lapse: the average time taken by the user to reply an incoming message from this person; (6) file_count: the number of incoming messages from this person that have been flagged or saved by the user; and (7) most-recent_interaction_time: the time of the most recent message exchanged between the user and this person. Clearly, other statistics may be recorded in an interaction between the user and sender, and the above mentioned exemplary list is not intended to be limiting.

Relationship Data of the Topic-Based User Model

The relationship between the user and the particular sender comprises one or more connections between the user and the sender. A connection is a particular type of link between the user and the sender. The connections between the user and his/her contacts may fall into different categories, for example, (1) Communicational: connections derived from senders and recipients of emails as well as participants of calendar meetings; (2) Organizational: connections based on organizational structure (e.g. managing, managed, same manager); (3) Social: connections derived from activities in enterprise online social networks, such as community co-membership, wiki co-editing, file sharing; and (4) Academic: connections as a result of academic activities such as paper/patent co-authoring. Clearly, other categories of relationships that may be used and the above mentioned exemplary list is not intended to be limiting.

Topic-based User Model Representation

Figure 3:
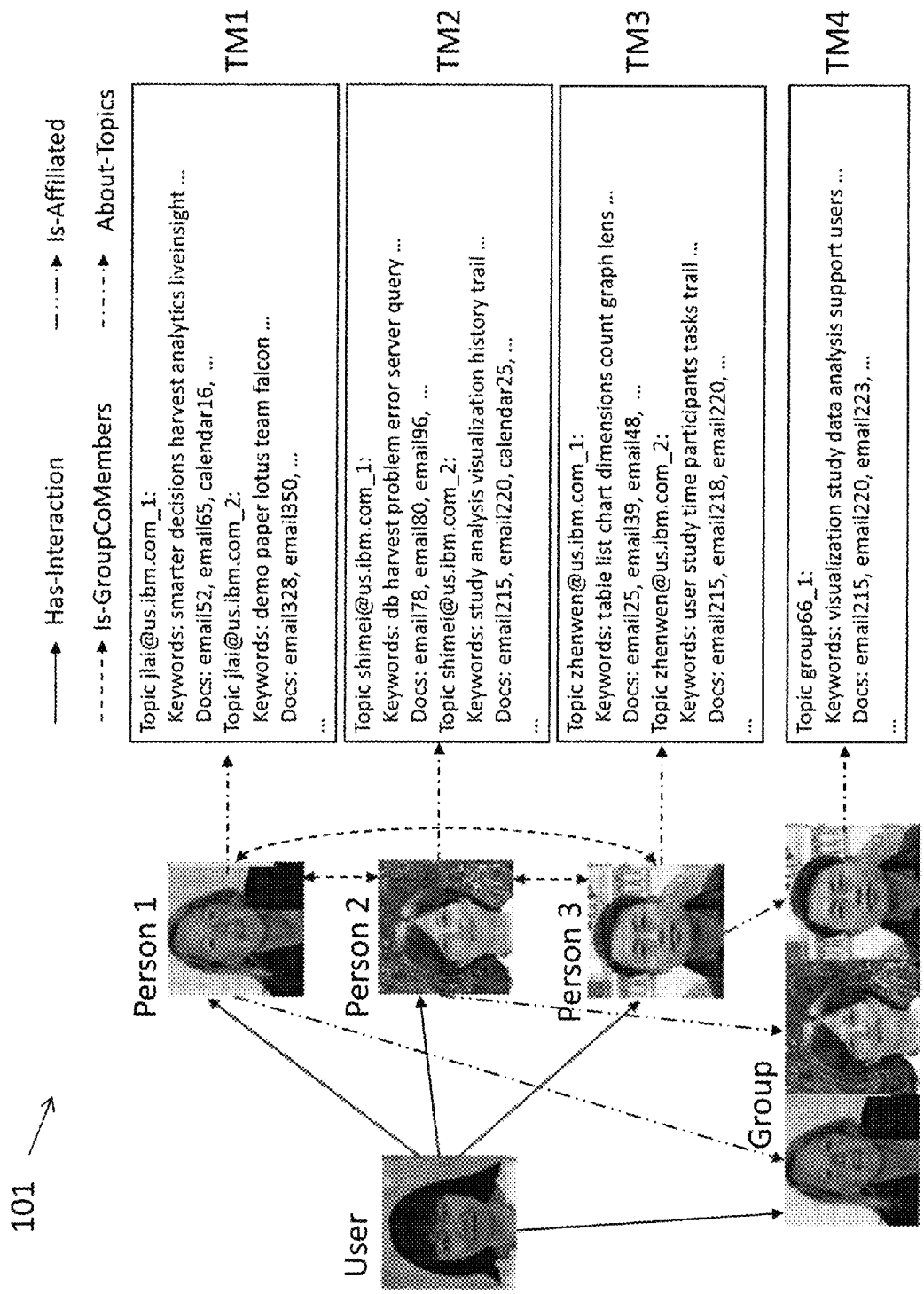
FIG. 3 illustrates an exemplary topic-based user model of the present invention.

Referring to FIG. 3, which illustrates an exemplary topic-based user model 101 incorporating features of an exemplary embodiment of the present invention. As shown in FIG. 3, the exemplary topic-based user model 101 encodes multiple tiers of information represent the user's information at different granularities. For example, basic information is extracted from the email and calendar messages, including textual content such as subject and body, as well as metadata about the attached files, the embedded web links, and the persons as email senders/receivers and meeting participants. Aggregate information is created by grouping basic information. Email and calendar messages are grouped into threads by subject. As shown in FIG. 3, people can be grouped based on their associations with email and calendar messages. Derived information, such as interactions and affiliations, link each person or group that has had interaction with the user to the corresponding set of basic and aggregate information.

Based on the basic, aggregate, and derived information encoded in a user model 101, multiple topic models, e.g., TM1-TM4, are created and stored in the user model 101 as well. Each topic model (TM1-TM4) is created based on the aggregate content of the user's interaction within a specific interaction scope. An interaction scope can be an email thread with multiple messages, the interaction with a single person/group, or the user's overall interaction with other people as a whole. A topic model associated with a thread represents the topics discussed in this thread. A topic model associated with a person or group reflects the user's topics of interest specific to this person or group. A general topic model derived from the aggregation of the user's interaction with all others represents the user's overall areas of work. The use of multiple topic models enables a user's topics of interest to be represented at a finer granularity, which yields more accurate inference of the topic of the message 151.

Each topic model (TM1-TM4) contains a set of topics. In an exemplary embodiment, each topic is associated with two types of information: the probability of a word given this topic for all the words, and the probability of this topic given a message for all the messages in the associated interaction scope. The former probability provides a list of representative keywords that describe the topic, while the latter provides a list of messages that are strongly associated with the topic. As is described below, topics may be derived from content based on statistical language models.

FIG. 3 also illustrates the information encoded in a topic-based user model 101. The user is linked to all the persons, e.g., person 1, 2 and 3, that she has had an interaction with through email and/or calendar messages, and the group(s) of persons derived from the lists of email recipients and meeting participants ("Has-Interaction"). Each person, e.g., person 1-3, is linked to the group she or he is affiliated with ("Is-Affiliated"). There are also group co-member relations among persons in the same group ("Is-GroupCoMembers"). Each person or group is linked to the topic model, e.g., TM1-TM4, associated with this person or group ("About-Topics"). Particularly, FIG. 3 shows three topic models specific to the user's interaction with person 1 TM1, person 2 TM2, and person 3 TM3, and a topic model TM4 specific to user's interaction with person 1-3 as a group.

Different connections between the user and each person or group are assigned different weights to reflect their inherently different strengths, e.g., organizational connections may be assigned a stronger weight than social connections in a workplace enterprise. The overall relationship strength between the user and a contact (e.g., person or group) is the weighted sum of all their connections. For example, in FIG. 3, the connections between the user and person 1 include direct-report and paper co-author. The overall relationship strength between the user and person 1 is thus the weighted sum of these two connections, where direct-report is given a higher weight than paper co-author.

Figure 4:
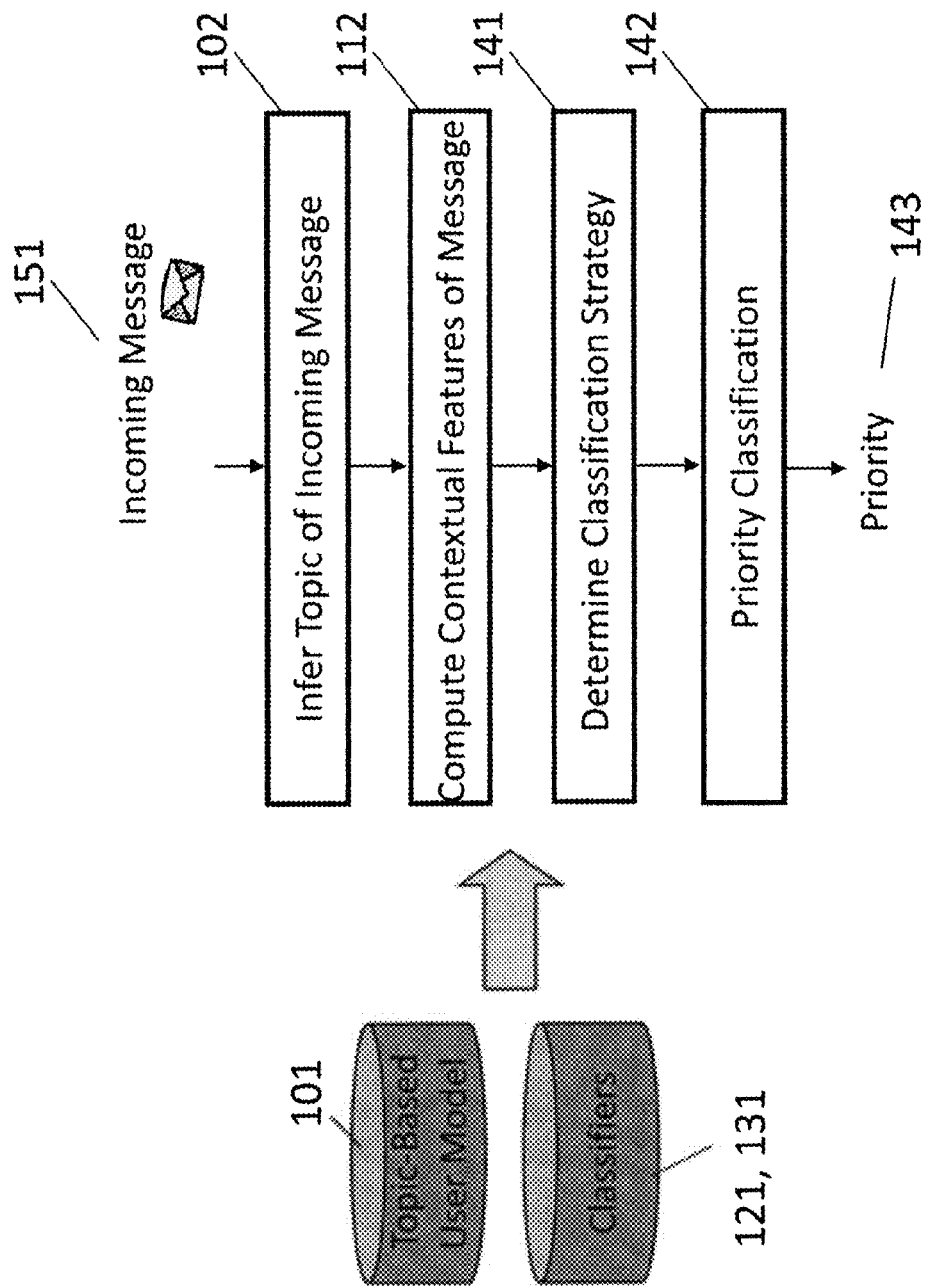
FIG. 4 illustrates a flow chart of an exemplary message prioritization process of the present invention.

Referring to FIG. 1, as was noted above, an incoming message 151 is input into the feature extraction module 110. Likewise, the topic-based user model 101 is input into the feature extraction module 110. As can be seen in FIG. 4, after the incoming message 151 is input into the feature extraction module 110, the feature extraction module 110 infers a topic 102 of the message based on the relevant topic models selected from all the topic models (e.g., TM1-TM4) contained in the topic-based user model 101. Thereafter, the feature extraction module 110 computes the contextual features of the message 151.

Contextual Features

As was noted above, as is shown in FIG. 4, the feature extraction module 110, infers the topic 102 of the incoming message 151, and then computes the contextual features 112 of the message 151.

The contextual features 112 used for prioritization are based on influential characteristics in determining the importance of a message 151. The contextual features 112 may fall into two categories, e.g., people-centric and message-centric.

People-Centric Contextual Features

People-centric contextual features 112 represent aggregate information about the user's interaction and relationship with the sender. In an exemplary embodiment, people-centric contextual features 112 are calculated after an interaction frequency threshold (T) has been met. For example, the interaction frequency threshold, T, may be a predetermined value, such as 50. However, one having ordinary skill in the art would understand that another interaction frequency threshold, T, value can be used. The people-centric features are calculated using various statistics encoded in the interaction data and the relationship data of a particular sender in the user model 101.

In an exemplary embodiment of the present invention, the people-centric contextual features 112 comprise the following aggregated information about the user's interaction with a particular sender.

(1) incoming_freq: the normalized frequency of incoming messages from the particular sender, which is calculated using the incoming_count encoded data of this sender from the user model 101. For example, in an exemplary embodiment, incoming_freq: is calculated as max(incoming_count, T)/T.

(2) outgoing_freq: the normalized frequency of outgoing messages to the particular sender, which is calculated using the outgoing_count encoded data of this sender from the user model 101. For example, in an exemplary embodiment, outgoing_freq: is calculated as max(outgoing_count, T)/T.

(3) read_rate: the percentage of incoming messages from the particular sender that have been read by the user, which is calculated using both the read_count and incoming_count encoded data of this sender from the user model 101. For example, in an exemplary embodiment, read_rate: is calculated as read_count divided by incoming_count.

(4) reply_rate: the percentage of incoming messages from the particular sender that have been replied by the user, which is calculated using both the reply_count and incoming_count encoded data of this sender from the user model 101. For example, in an exemplary embodiment, reply_rate is calculated as (reply_count divided by incoming_count).

(5) reply_lapse: the lapse of time between receiving a message and replying to the message, which is calculated using the reply_lapse encoded data of this sender from the user model 101. For example, in an exemplary embodiment, the people centric contextual feature 112 of reply_lapse is calculated as the reply_lapse of this sender from the user model 101 and is measured in days. In other exemplary embodiments, the average time taken by the user to replay to an incoming message from the particular sender can be measured in units other than days.

(6) file_rate: the percentage of incoming messages from the particular sender that have been flagged or saved by the user, which is calculated using both the file_count and incoming_count encoded data of this sender from the user model 101. For example, in an exemplary embodiment, file_rate is calculated as (file_count divided by incoming_count).

(7) interaction_recency: the recency of interaction between the user and the particular sender, which is calculated using the most_recent_interaction_time encoded data of this sender from the user model 101. For example, in an exemplary embodiment, interaction_recency is calculated as $1.0/(\log(t+1.0)+1.0)$, where t is the time lapse measured in days between current time and most_recent_interaction_time of this sender from the user model. In other exemplary embodiments, the time lapse can be measured in units other than days.

(8) relationship_type: the connection between the user and the particular sender, which is calculated using the connection type encoded data of the relationship data of this sender from the user model 101. For example, in an exemplary embodiment, relationship_type is set as the connection between the user and the sender that has the highest associated weight.

(9) relationship_strength: the overall relationship strength between the user and the particular sender, which is calculated using the connection types encoded data of the relationship data of this sender from the user model 101. For example, in an exemplary embodiment, relationship_strength is calculated as the weighted sum of all of the relationship connections between the user and the particular sender.

Message-Centric Contextual Features

Message-centric features focus on the properties of the message 151 itself. In an exemplary embodiment, the message-centric features comprise:

(1) message_scope: whether the message 151 is sent exclusively to the user, or to a small group of people, or to a large group of people. The threshold of what constitutes a small group of people and a large group of people can be predetermined or can be set by via, for example, the interface 150.

(2) message_type: whether the message 151 is, for example, a regular mail message, a meeting notice that requires user action, e.g. invite, reschedule, or a meeting notice that does not require user action, e.g. confirm, or something else, e.g. automatic message like out-of-office reply.

(3) content_type: whether the message 151 content is determined to contain a request, time-critical words, e.g. deadline, keywords pre-specified by the user, and/or one or more file attachments. The value of content_type can be determined based on lexical heuristics or other text analytic algorithms.

(4) threading: if the message belongs to an email thread, then determining if the user has taken any action on previous messages from the same thread. If the user has taken action on previous messages from the same thread, then the value of this feature is 1. Otherwise, its value is 0.

(5) topic_likelihood: the likelihood that the content of the message 151 is about a topic inferred 102 by the system using the Latent Dirichlet Allocation algorithm (LDA), which is calculated based on LDA's document-topic distribution contained in the topic-based user model 101.

(6) topic_importance: the inferred importance of the topic to the user based on the content of the message 151.

In conventional technologies, the topics derived by the LDA are not ranked and, therefore, information about topic importance cannot be directly obtained from the LDA. Conventional attempts to infer topic importance have been based on criteria such as topic coverage and variance, topic distinctiveness, topic mutual information, topic similarity and redundancy.

The present inventors have recognized that in the message domain, e.g., email message domain, the user actions associated with the message 151 provide a better indicator of user-perceived topic importance. Therefore, in an exemplary embodiment of the present invention, topic_importance is computed using a weighted combination of the following factors:

(6.1) the percentage of the user's emails that are about the particular topic;

(6.2) the percentage of the emails about the particular topic that were determined to have been read; and (6.3) the percentage of the emails about the particular topic that were forwarded, replied, saved, or flagged.

Prioritization

As was noted above, an incoming message 151 is input into the feature extraction module 110. Likewise, the topic-based user model 101 is input into the feature extraction module. As can be seen in FIG. 4, after the incoming message 151 is input into the feature extraction module 110, the feature extraction module infers a topic 102 of the message 151 based on the content of the message 151, discussed above, and on the topic models relevant to the sender from the topic-based user model 101. Thereafter, the feature extraction module 110 computes the contextual features 112 of the message as discussed above.

In an exemplary embodiment of the present invention, there is a global classifier 121 and a user-specific classifier 131. The global classifier 121 and the user-specific classifier 131 are combined in the classification module 140. Preferably, the classifiers 121 and 131 are combined using different approaches when different messages 151 have different contextual features 112. That is, based on the topic-based user model 101 and the extracted features of the message 151, the classification module 140 combines the global classifier 121 and the user-specific classifier 131 in a dynamic manner.

As can be seen in FIG. 4, the topic of the incoming message 151 is inferred.

Global Priority Classifier

In an exemplary embodiment of the present invention, the system uses linear regression (chosen for its efficiency and robustness) to create a global priority classifier 121 based on labeled training messages 111 collected from multiple users. Using the global priority classifier, the priority score $S_g$ of an incoming message 151 is a linear combination of the contextual features 112 of the message 151:

$$S_g = \sum_{i=1}^{n} a_i f_i$$

where $f_i$ is the value of the message's i-th contextual feature 112 as defined in above, e.g., people centric contextual features (1)-(9) and message centric contextual features (1)-(6), and $a_i$ is the regression parameter representing the automatically learned weight for the particular contextual feature 112.

In a preferred embodiment, before the training data 111 is input into the batch learning module 120, feature selection is performed to remove features of the training data 111 that lack variations, since such features do not have prediction power and may cause the regression to fail. Specifically, in the preferred embodiment, features with a variance of less than a predetermined threshold, e.g., 0.001, are filtered out. In an exemplary embodiment, during learning via the batch learning module 120, the priority score $S_g$ is set to 1 for "high-priority" messages and −1 for "low-priority" messages. To determine the priority of an incoming message 151 using the global classifier 121, the classification module 140 calculates the priority score $S_g$ value based on the values of the incoming message's 151 contextual features 112 having been output by the feature extraction module 110 and received by the classification module 140. The classification module 140 then classifies the message 151 as "high priority" if the priority score $S_g$ is greater than a classification threshold $t_c$. The value of the classification threshold $t_c$ can be determined based on application needs or user preferences. For example, if low false-negative rate is required or desired, e.g., the user does not want to miss important emails, and high false-positive rate (unimportant emails mistakenly labeled as high-priority) can be tolerated, then a smaller classification threshold tc value is used.

User-Specific Priority Classifier

A user-specific classifier 131 is dynamically learned based on ongoing user feedback, for example, via the interface 150. Although implicit feedback derived from user actions such as reading or replying an email message may imply the priority of the incoming message 151, this type of implicit feedback is often inaccurate and unreliable. Therefore, the present inventors have recognized a need to focus on using explicit user feedback to obtain more accurate and reliable ground truth data when creating the user specific classifier 131. However, user actions such as reading or replying an email message can be considered positive feedback and the lack of user actions such as ignoring an email message can be considered negative feedback, and such feedback can be used to create and update the user-specific classifier in a way similar to what is described below.

For example, an exemplary embodiment of the present invention is configured to accept user feedback, e.g., via the interface 150. That is, when a user provides priority feedback for a message 151, the system records the priority label, e.g. "high-priority" or "low-priority" because of the sender and/or the subject, along with the contextual features 112 of the message 151 to create a user-specific feedback instance. When a predetermined threshold of user-specific feedback instances are created/collected for a user, then linear regression may be used to learn a user-specific classifier 131. Using the user-specific classifier, the priority score $S_u$ of an incoming message 151 is a linear combination of the contextual, features 112 of the message 151:

$$S_u = \sum_{i=1}^{n} b_i f_i$$

where $f_i$ is the value of the i-th contextual feature 112 of the message 151, as is defined in above, and $b_i$ is the regression parameter representing the user-specified learned weight for the particular contextual feature 112. The user-specific classifier 131 is dynamically updated as the number of feedback instances grows.

Priority Classification

As can be seen in FIG. 4, after the feature extraction module 110 computes the contextual features 112 of the message 151, the classification module determines a classification strategy 141 for the message 151, and then uses the classification strategy 141 to perform priority classification 142 in order to generate the priority 143 of the message 151. Thereafter, the priority 143 for the message 151 is input into the interface 150. Preferably, the interface 150 displays the priority 143 of the message 151 in the interface 150.

The present inventors have recognized that, in theory, a user-specific classifier 131 should perform better than a global classifier 121 since the criteria used by different users for determining message priority 143 are likely not the same. However, the present inventors have recognized that in practice, it may be the case that few users will provide sufficient amount of feedback needed to train a comprehensive user-specific classifier 131, especially during the initial period of training the system. Therefore, the present inventors have recognized a need for priority classification that is based on a combination of the global classifier 121 and the user-specific classifier 131. Three exemplary schemes of combination of the global classifier 121 and the user-specific classifier 131 will be discussed below.

1. Basic Linear Combination (BASIC)

The BASIC scheme of an exemplary embodiment of the present invention, linearly combines the priority scores $S_g$ and $S_u$ from the global classifier 121 and the user-specific classifier 131, respectively, as:

$$s = w \times s_g + (1-w) \times s_u$$

where w is the weight assigned to the global classifier 121. In a preferred embodiment of the present invention w is assigned a weight of 0.5.

2. Dynamic Linear Combination with Instance Matching of Contextual Features (DYNAMIC+FEATURES)

Given a new message M, this scheme dynamically assesses the quality of the user-specific classifier 131 to decide if the user-specific classifier 131 is a reliable choice for determining the priority 143 of the new message M. The quality of the user-specific classifier 131 is estimated based on the matching between M and previous feedback instances which are used to train the user-specific classifier. Specifically, the scheme computes the shortest feature-based distance as:

$$d = \min_{j} \left( \sum_{i=1}^{n} (f_{Mi} - f'_{ji}) \right)$$

where $f_{M,i}$ is the value of the i-th contextual feature 112, as discussed above, of the new message M and $f'_{j,i}$ is the value of the i-th contextual feature 112 and the j-th feedback instance.

In an exemplary embodiment, if d is below a predetermined threshold, then it is determined that previous feedback instance(s) contain message(s) similar to the new message M, which implies that the user criteria of determining the priority 143 of a message similar to the new message M has been encoded in the user-specific classifier 131. As a result, the user-specific classifier 131 is expected to perform well in predicting the priority 143 of the new message M. Accordingly, in an exemplary embodiment of the present invention, when the user-specific classifier 131 is expected to performed well, as described above, the weight w of the global classifier 121 is set to 0 in linear combination, essentially utilizing the user-specific classifier 131 only. On the other hand, if the shortest feature-based distance d, as calculated, has a value that is above the predetermined threshold, then the basic linear combination of the two classifiers 131 and 121, as described in the BASIC scheme above, is used.

In a preferred embodiment of the present invention, the predetermined threshold of d is set to 0.5. Further it is noted that while one similar feedback instance is needed in order for the user-specific classifier to be used alone for determining the message's priority 143, requiring the new message M to be similar to at least a predetermined threshold percentage of the feedback instances in order to use the user-specific classifier 131 alone might improve the accuracy for the applicable cases, however, there would be fewer applicable cases when compared to requiring only one similar feedback instance.

3. Dynamic Linear Combination with Instance Matching on Sender/Subject (DYNAMIC+SENDER/SUBJECT)

It has been considered that message priority 143 is a function of the predicted utility of message content inferred from sender and subject of the message. In addition, the present inventors have recognized that it is difficult for users to articulate prioritization criteria along the dimensions of contextual features 112. Accordingly, in an exemplary embodiment of the present invention, the interface 150 is only configured to solicit user feedback on the sender and the subject of the message 151. This embodiment avoids a complex interface 150 that might confuse users or even discourage them from providing feedback, but still allows the system, via, for example, the feedback learning module 130, to collect valuable feedback utilized by the priority classification technique of dynamic linear combination with instance matching on the sender and subject of the message 151.

For example, in an exemplary embodiment, if a new message 151 matches one previous feedback instance on the main factor(s) indicated by the user, e.g., a match for sender and substring match for subject, then the message 151 is given the same priority as the previous feedback instance. If the message 151 matches multiple feedback instances, then the message 151 is assigned the priority of the most recent feedback instance. Otherwise, the BASIC scheme, described above, is used to determine the message's priority 143.

Figure 5:
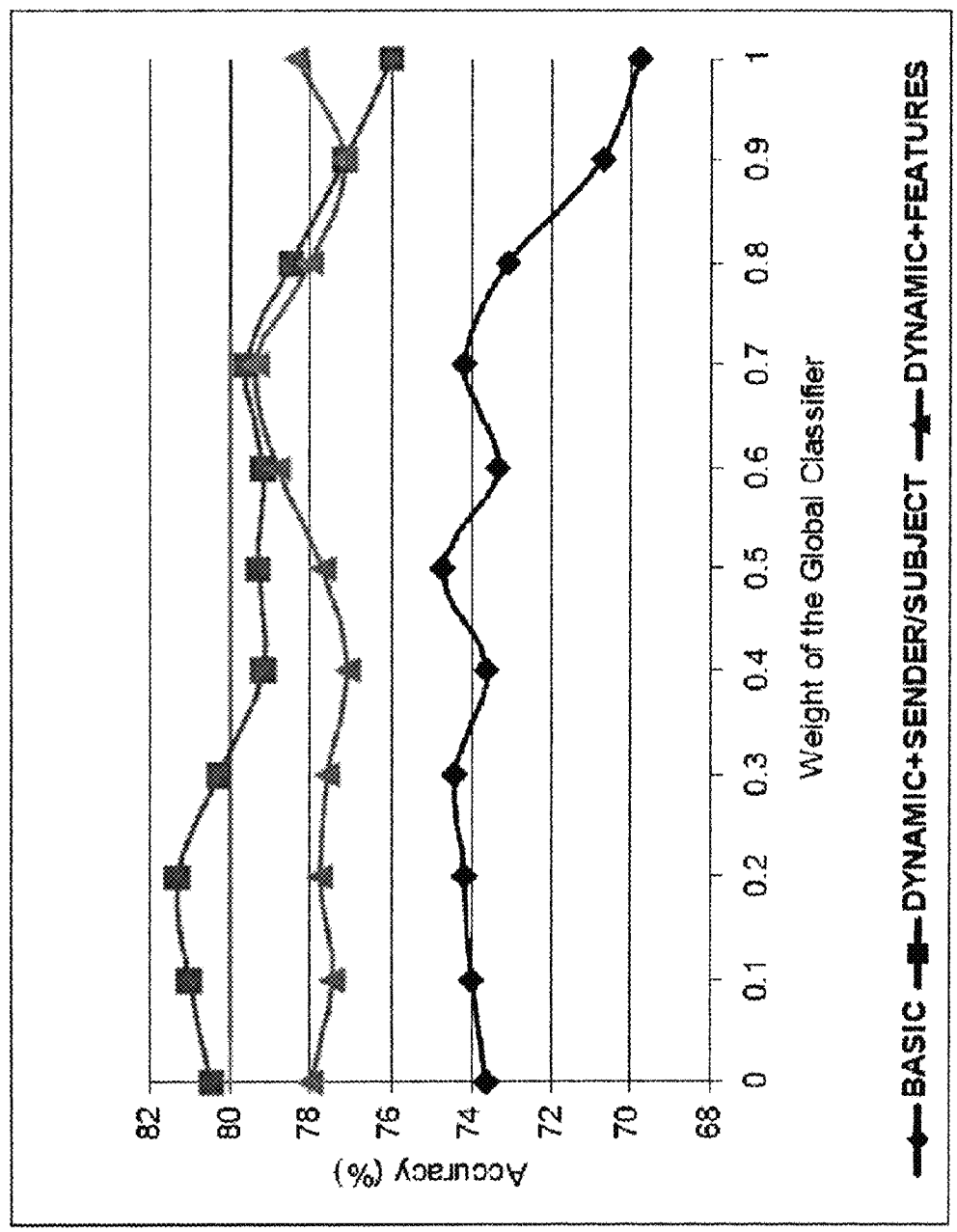
FIG. 5 illustrates the accuracy results of three exemplary priority classification schemes across different weight settings of the classifiers.

Accuracy Results for Each of the Three Exemplary Priority Classification Schemes FIG. 5 shows the accuracy results for the three priority classification schemes discussed above, when different weights were used to combine the global classifier 121 and the user-specific classifier 131. For example, based on the labeled training data in Table 1, below, the inventors concluded the following.

TABLE 1

Summary statistics of labeled messages used for evaluation of an exemplary embodiment of the present invention

| | # of high-priority message marked by user | # Low-priority message marked by user |
|---|---|---|
| Because of sender | 257 (22.80%) | 193 (20.60%) |
| Because of subject | 209 (18.55%) | 410 (43.76%) |
| Because of both | 661 (58.65%) | 334 (35.64%) |
| Total | 1,127 | 937 |

As can be seen in FIG. 5, for the BASIC scheme, using the data in Table 1, the highest accuracy (74.7%) was achieved when the global classifier 121 and the user-specific classifier 131 were combined in the classification module 140 with equal weights (w=0.5). Using the global classifier alone (w=1) resulted in the lowest accuracy. From this the present inventors have concluded that different users use different criteria for determining message priority 143. Using the user-specific classifier 131 alone (w=0) had better performance than using the global classifier 121 only, which demonstrates the importance of personalization in email prioritization. However, using the user-specific classifier 131 alone did not yield the best accuracy, from this the present inventors have concluded that quality of the user-specific classifier 131 for some users might not be high due to insufficient feedback.

Likewise, as can be seen in FIG. 5, for the DYNAMIC+FEATURES prioritization scheme, the best accuracy (79.4%) was produced when the global classifier 2 was given a higher weight (w=0.7) in the classification module 140. This was because when the system decided to use a combination of the user-specific classifier 131 and the global classifier 121 instead of the user-specific classifier 131 alone (for ~60% of the test data in our experiments), it was for the cases when the user-specific classifier 131 did not perform well by itself, thus relying more on the global classifier 121 yielded better accuracy. From this the present inventors has discovered that the instance matching-based quality assessment of the user-specific classifier 131 worked reasonably well.

Lastly, as can be seen in FIG. 5, for the DYNAMIC+SENDER/SUBJECT priority classification scheme, a lower weight for the global classifier 121 (w=0.2) yielded the highest accuracy (81.3%). This optimal weight (which favors the user-specific classifier 131) is different from the optimal weight (0.7) for DYNAMIC+SENDER/SUBJECT. The reason was because only a small portion (~10%) of the test data had matching sender/subject in the training data. Among the rest of the test data, the user-specific classifier 131 performed well in a lot of cases. If the global classifier 121 were given a higher weight, it would decrease the accuracy for these cases, resulting in an overall worse performance.

Among all three priority classification schemes, the two DYNAMIC schemes consistently outperformed the BASIC scheme in all weight settings, and DYNAMIC+SENDER/SUBJECT worked better than DYNAMIC+FEATURES in most settings, which demonstrates that the additional information gathered in the feedback learning module 130 from the user, e.g., level of priority due to the sender, subject or both, helped improve the prioritization performance over conventional technologies.

Figure 6:
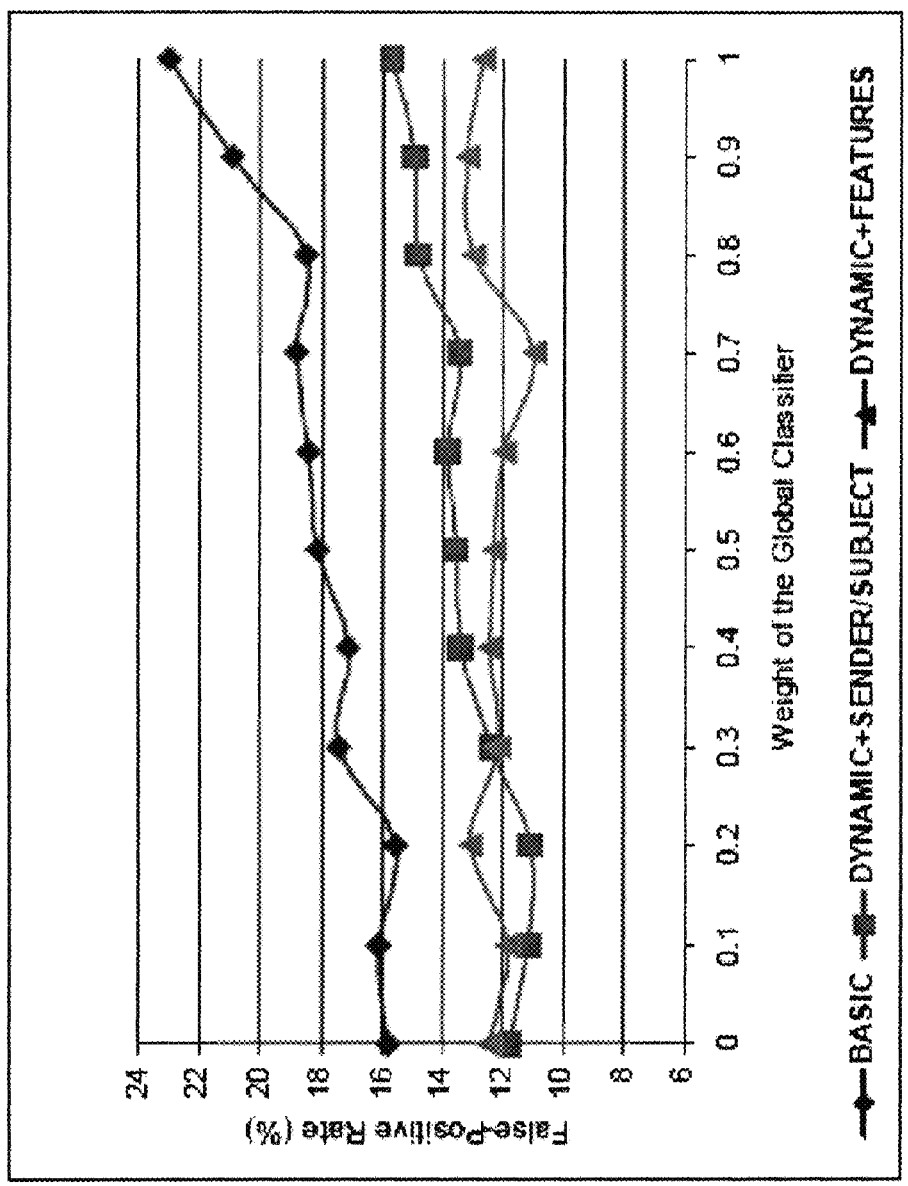
FIG. 6 illustrates the false-positive rates of three exemplary priority classification schemes across different weight settings of the classifiers.
Figure 7:
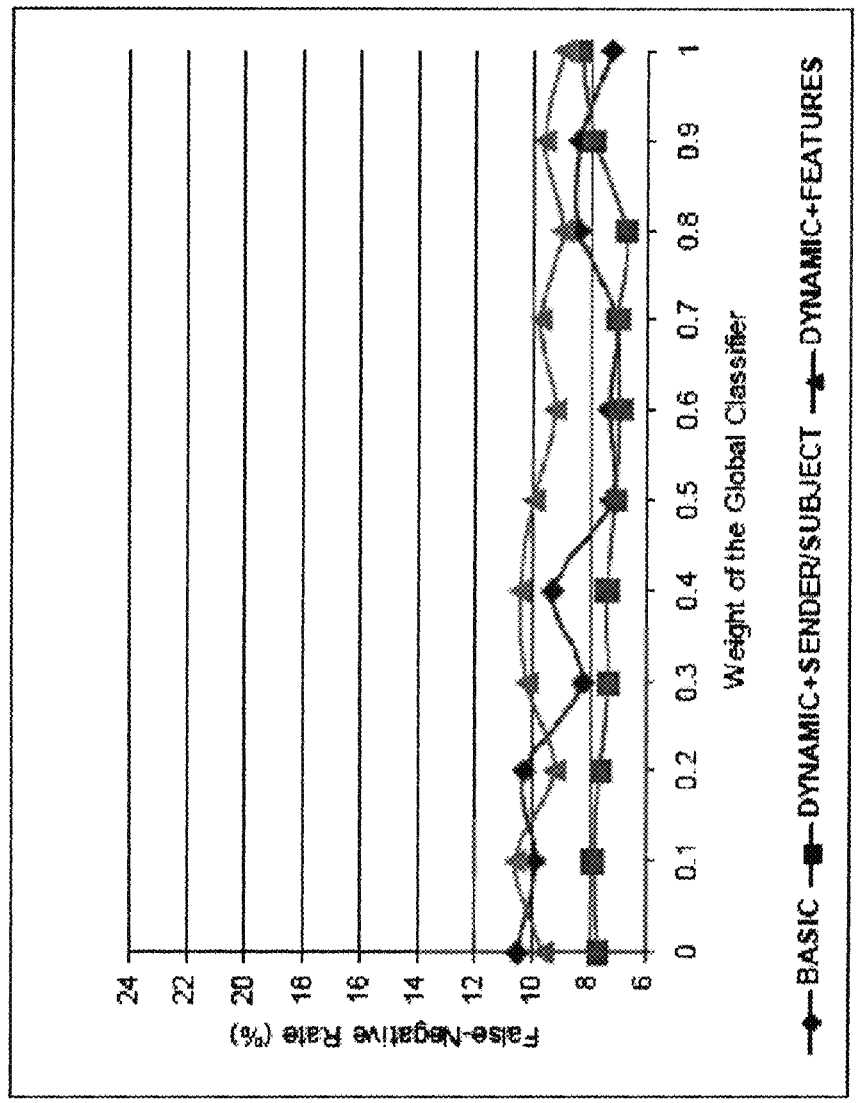
FIG. 7 illustrates the false-negative rates of three exemplary priority classification schemes across different weight settings of the classifiers.

FIGS. 6 and 7 depict the results of false-positive rate and false-negative rate respectively for different priority classification schemes. As can be seen in FIG. 6, when the global classifier 121 is used alone in the classification module 140, e.g., w=1, a very high false-positive rate (23.0%) results. This is due to the fact that some users labeled a much smaller percentage of their messages as high-priority compared to the average (for example, the percentage of high-priority messages from one user was 27% while the average percentage of high-priority messages from all users was 55%). From this discrepancy, the present inventors discovered that different users have different standards when determining high vs. low priority, some "stricter" than others. As a result, while a message may be considered "low priority" by one user, similar emails may be regarded as "high priority" by other users. Clearly, using the global classifier 121 created based on the training data from all users will produce high false-positive rate for those with "stricter" standards.

As can be seen in FIGS. 6 and 7, for each of the prioritization schemes, the values of false-negative rate (FIG. 7) were consistently lower than those of false-positive rate (FIG. 6), indicating that the classification threshold value of 0 is a reasonable choice for the (common) situations where low false-negative rate is preferable to low false-positive rate. As can be seen in FIG. 6, both of the DYNAMIC schemes had a lower false-positive rate than the BASIC scheme, but as can be seen in FIG. 7, the DYNAMIC+FEATURES scheme did not perform well measured in false-negative rate. On the other hand, the DYNAMIC+SENDER/SUBJECT scheme consistently performed well for both false-positive rate and false-negative rate. As can be seen in FIGS. 6 and 7, the DYNAMIC+SENDER/SUBJECT scheme was also the least sensitive to different weight settings, especially for the false-negative rate (FIG. 7).

Figure 8:
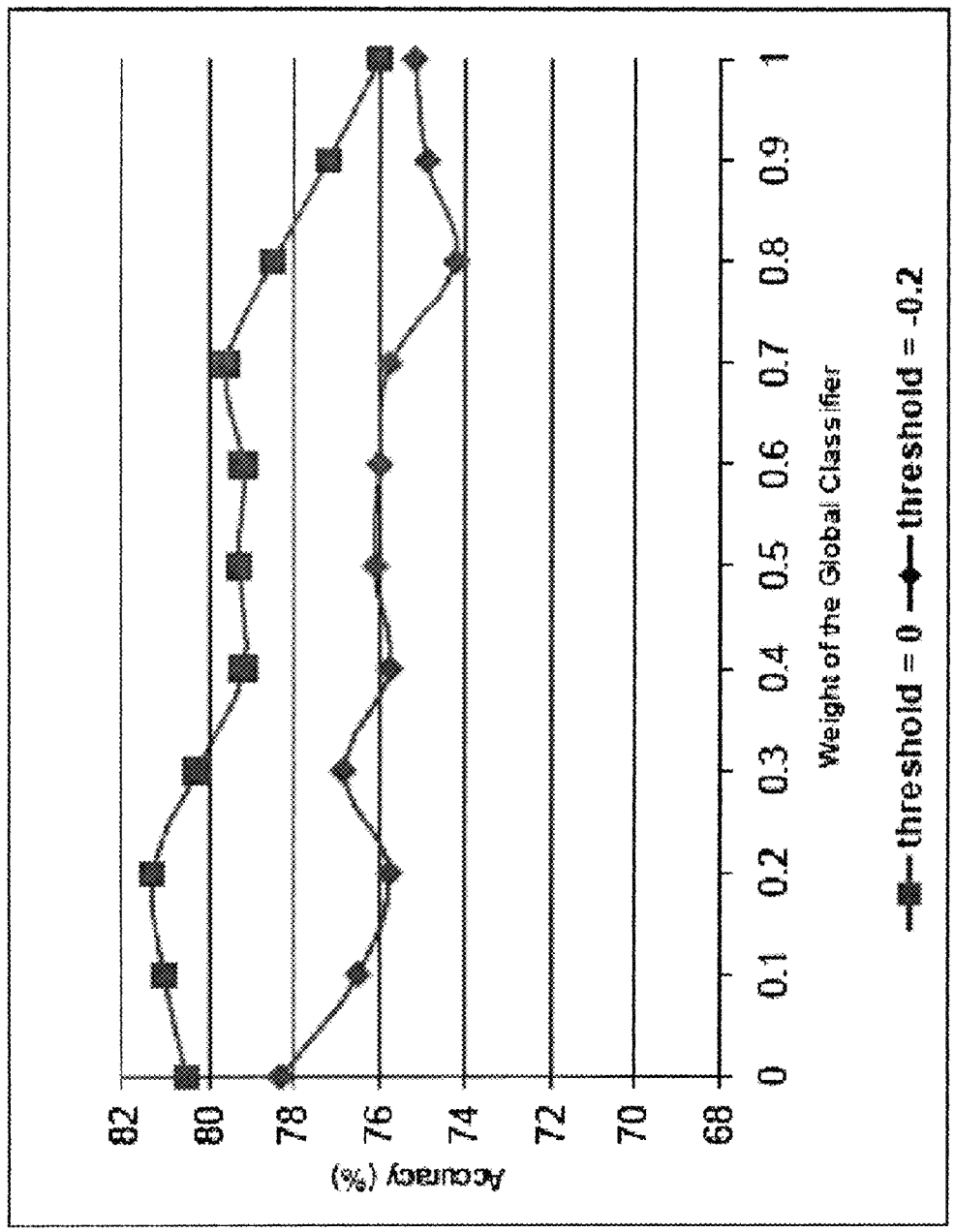
FIG. 8 illustrates the accuracy results of the DYNAMIC+SENDER/SUBJECT classification scheme with different classification threshold values across different weight settings of the classifiers.
Figure 9:
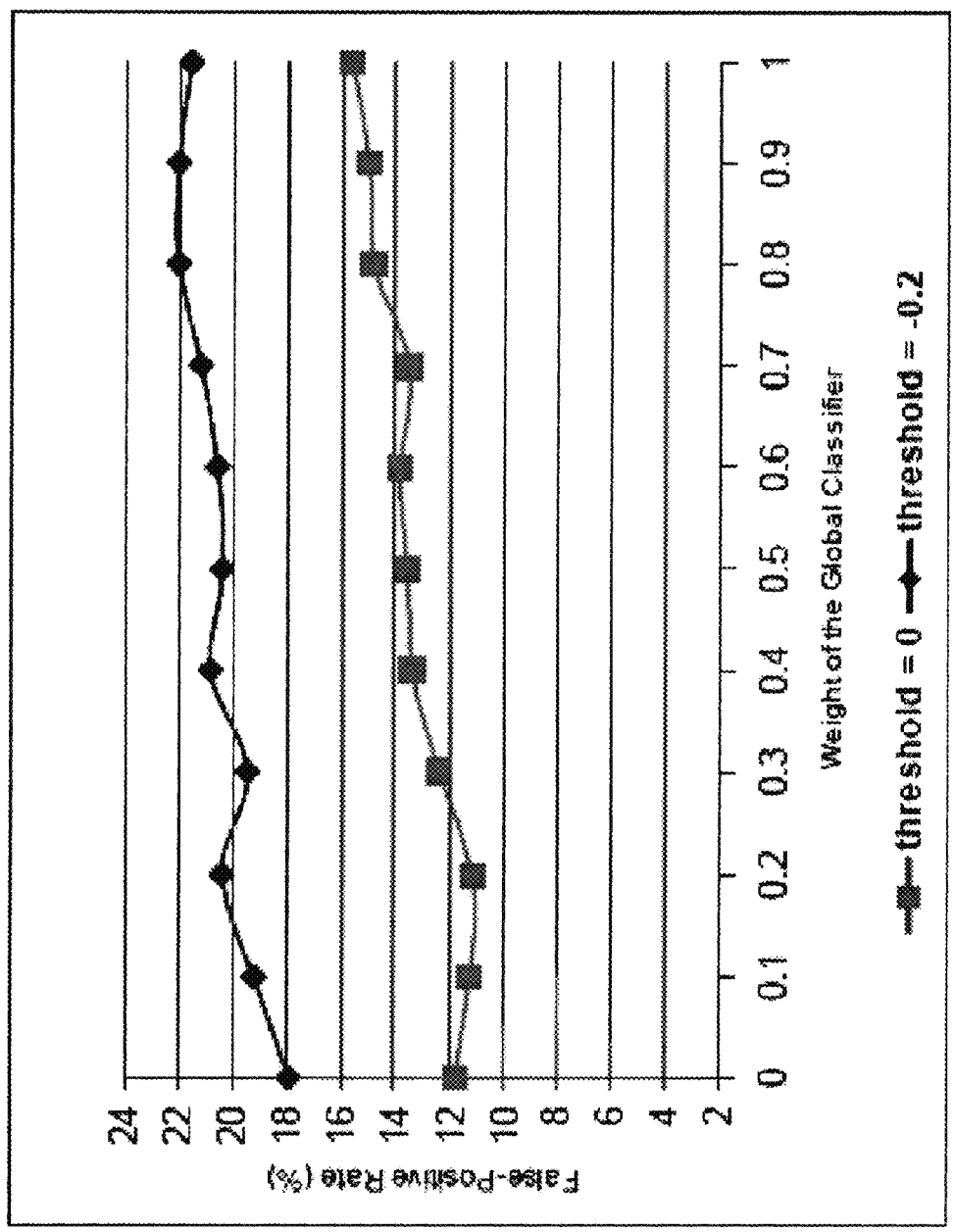
FIG. 9 illustrates the false-positive rates of the DYNAMIC+SENDER/SUBJECT priority classification scheme with different classification threshold values across different weight settings of the to classifiers.
Figure 10:
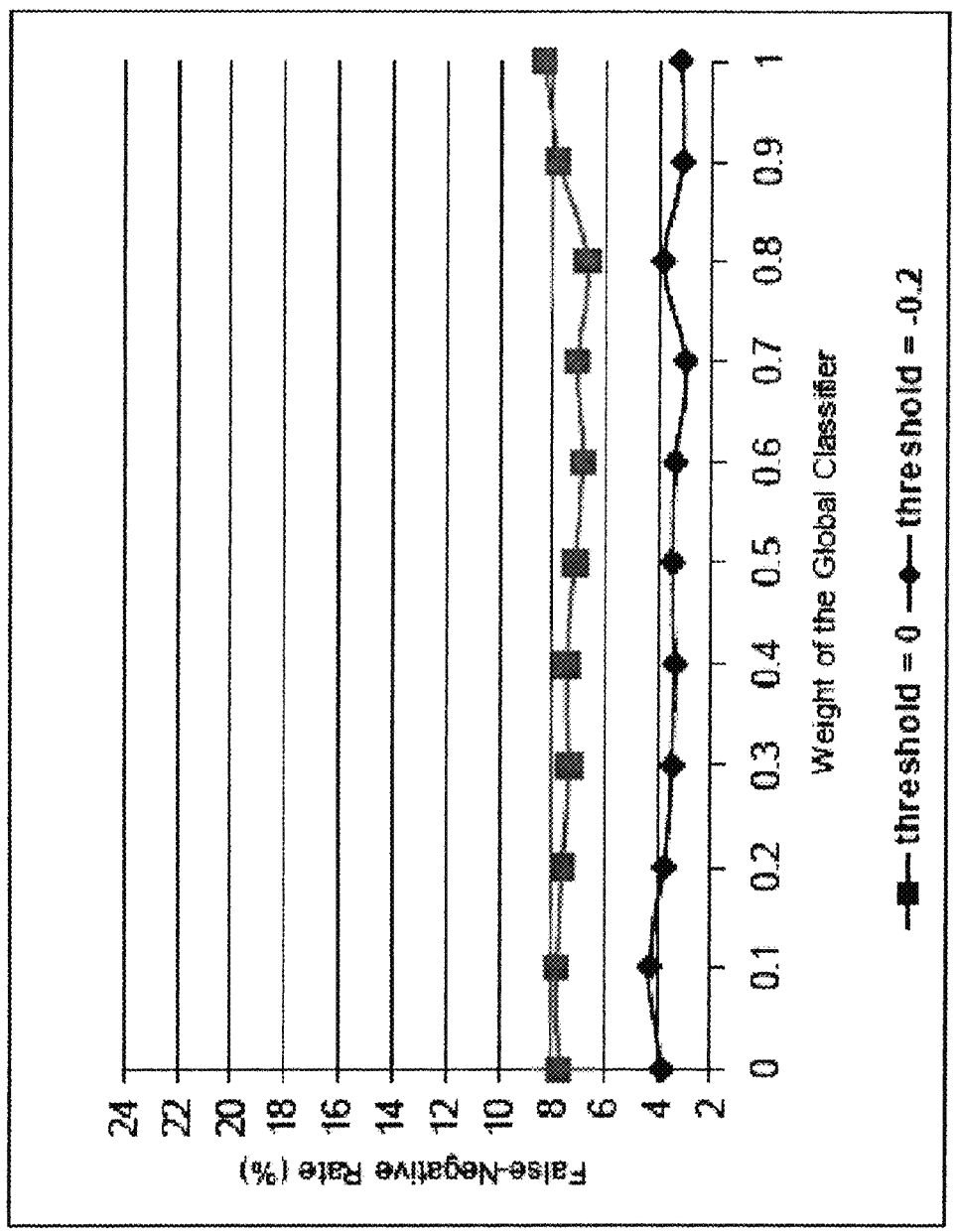
FIG. 10 illustrates the false-negative rates of the DYNAMIC+SENDER/SUBJECT priority classification scheme with different classification threshold values across different weight settings of the classifiers.

To examine how a different classification threshold value would affect these rates, the present inventors tested the threshold value of −0.2 for DYMAMIC+SENDER/SUBJECT, the best performer among the three schemes. FIGS. 8, 9 and 10 compare the results of using 0 vs. −0.2 for the classification threshold. The present inventors discovered that the smaller threshold value −0.2 reduced false-negative rate to less than 4% (FIG. 10), at the cost of increased false-positive rate (FIG. 9) and reduced overall accuracy (FIG. 8).

To investigate the relative value of different contextual features 112 for the prioritization of a message 151, the present inventors compared the weights of different contextual features 112 in the learned global classifier 121 and the learned user-specific classifier 131. A large absolute weight value for a contextual feature 112 indicates the predicting power of the particular feature to determine priority of a message 151. A contextual feature 112 that has a small variance in its weights across multiple user-specific classifiers 131 indicates its robustness in determining the priority of a message 151. Based on these two criteria (large absolute value and small variance), the present inventors have disclosed that the "most important" of the exemplary contextual features 112 include both people-centric features (incoming_freq, outgoing_freq, relationship_strength, reply_lapse, and file_rate) and message-centric features (message_scope, threading, and topic_importance). Each of these features is discussed above.

Figure 11:
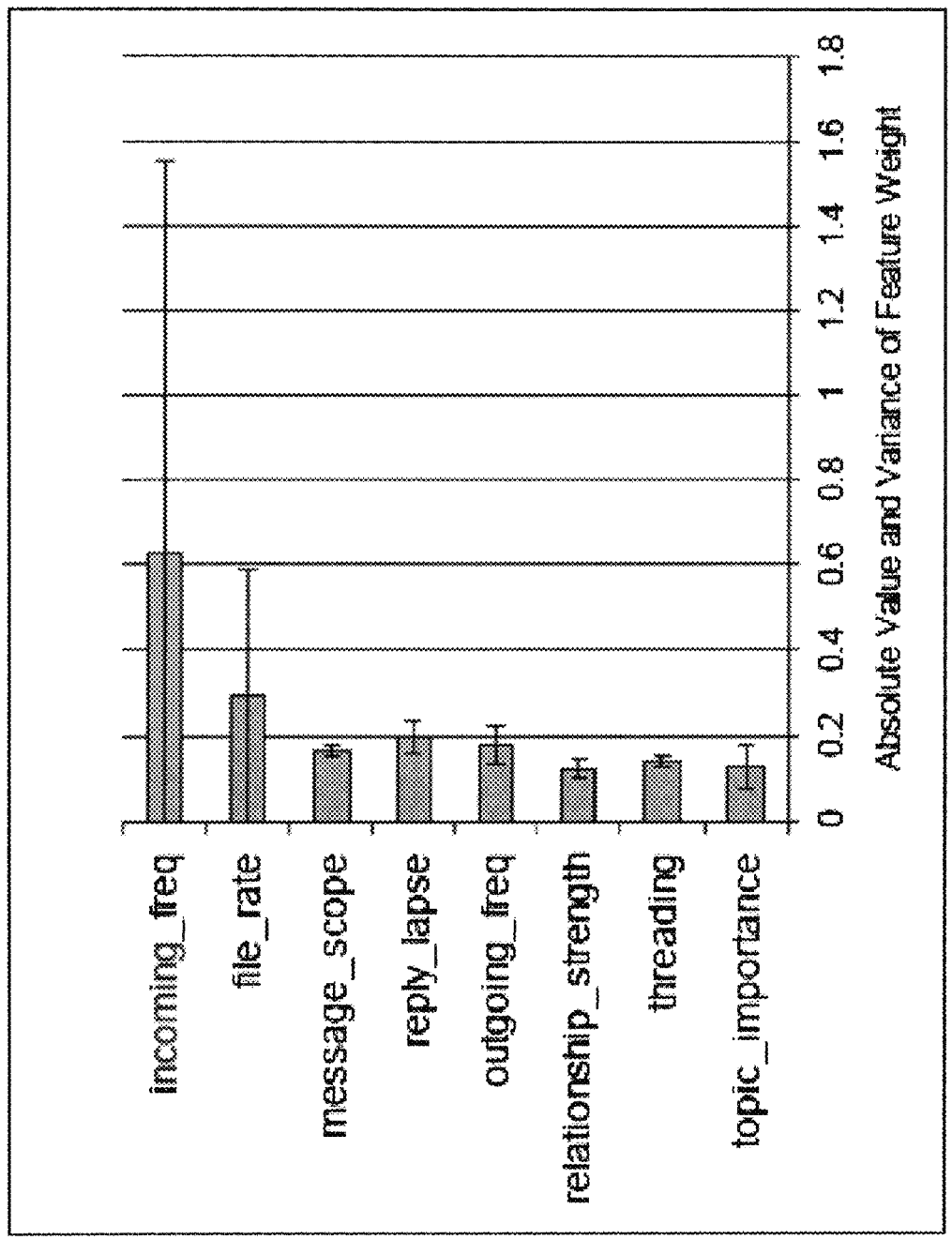
FIG. 11 illustrates important contextual features for email prioritization.

As can be seen in FIG. 11, the incoming_freq feature has the highest mean absolute weight, indicating its high predicting power in general for email prioritization. However, incoming_freq also has a large variance in its weights for different user-specific classifiers 131, which means that the incoming_freq's value in determining the priority of a message 151 is highly user-dependent.

In contrast, the outgoing-freq feature, which is similar to incoming_freq in nature, not only provided good predicting power (large mean absolute weight), but also was stable across different users (small variance).

Based on the above, it can be seen that there is value in the addition of a user-specific classifier 131 and a dynamic strategy for combining the global classifier 121 and the user specific classifier 131 in the classification module 140. Specifically, the present inventors have discovered that using either type of classifier 131 or 121 alone does not achieve an accuracy for message prioritization that is as high an accuracy achieved when using a combination of the user-specific classifier 131 and the global classifier 121. Using a dynamic strategy to combine a global classifier 121 with a user-specific classifier 131 improves performance in specific, but frequently occurring (common), cases. In cases when the user feedback to the feedback learning module 130 is insufficient for creating a reliable user-specific classifier 131, or when the context covered by the existing feedback is not applicable to the new message 151, the global classifier 121 is utilized to augment the system's robustness. In cases when the user feedback is highly relevant to the context of the new message 151, the system is able to directly apply the user-specific criteria it has learned from such feedback to provide better personalized prioritization.

By adjusting the classification threshold value, an exemplary embodiment of the present invention can be tailored to favor false positives over false negatives. This is desirable since there may be less potential harm in presenting the user with an unimportant message to review as opposed to causing the user to miss a key message.

In an exemplary embodiment of the present invention, the user may adjust the classification threshold value manually. In another exemplary embodiment, the classification threshold value can be dynamically adjusted based on users' behavior and feedback, thus adapting the system to suit a user's specific needs and requirements.

In addition, false positives can be reduced without negatively affecting false negatives. For example, in an exemplary embodiment of the present invention, the system is configured to allow the user to label certain messages as "can't miss", and the system can create a model to encode the characteristics of these messages and use that information in combination with the user-specific classifier 131 and global classifier 121 to determine the priority of a message 151.

In a preferred embodiment of the present invention, the system only uses explicit user feedback input into the feedback learning classifier 130. This allows the exemplary embodiment to avoid implicit feedback that can be noisy and unreliable. For example, a user may only preview a message s/he considers "high-priority" instead of opening to read it. Also, user actions in response to a message 151 may be taken in other communication channels, e.g., a phone call, a face-to-face meeting, an instant message, etc.

Prior research indicates that only a small portion of incoming messages, .e.g., ~14%, are replied to. Also users read mail they acknowledge is not important, and the influence of user-perceived importance is small in the decision to reply a message. However, since it is not always the case the users provide sufficient user feedback, implicit feedback can provide some valuable information. Therefore, in another exemplary embodiment of the present invention, implicit user can be utilized by the system to improve the prioritization. For example, the system can learn, via the feedback learning module 130, from user behavior such as skipping certain messages in the "high priority" category, while taking immediate action on messages in the "normal" category.

In this exemplary embodiment, a threshold value of the number of instances of an implicit behavior can be incorporated in order to provide a more reliable user-specific classifier. Also, other metrics can be used to identify implicit user behavior that is considered to be a reliable indicator of the priority of a message 151. For example, a single specific action, a combination of multiple types of actions, or even action patterns, may be used to train the user-specific classifier 131 to identify the priority level of a message.

As discussed above, an exemplary embodiment of the present invention provides a system that automatically prioritizes an incoming message 151 using a topic-based user model 101 and a multi-tiered approach to priority classification in the classification module 140. The exemplary embodiment of the present invention uses a variety of contextual features 112 to determine the priority level of a message 151, and the contextual features 112 of the message are computed in the feature extraction module 110, based on the metadata and content of the message 151 and a fine-grained user model 101. The user model 101 encodes information about the user's interaction history and relationship with each of his/her email contacts 91 (e.g., a person the user has communicated with through email) and the topics they discussed. The topic-based user model 101 is dynamically built from the user's previous emails 91 as well as other relevant data 90 (e.g. organizational structure). To determine the priority of a message 151 based on the feature values, the system dynamically combines in the classification module 140, a global classifier 121 created using labeled training data 111 from multiple users and a user-specific classifier 131 built for each user based on his/her ongoing feedback input into the feedback learning module 130. The global classifier 121 helps alleviate the cold start problem and improve the robustness of priority prediction, while the user-specific classifier 131 increases the system's adaptability and enables quick response to user feedback.

Figure 12:
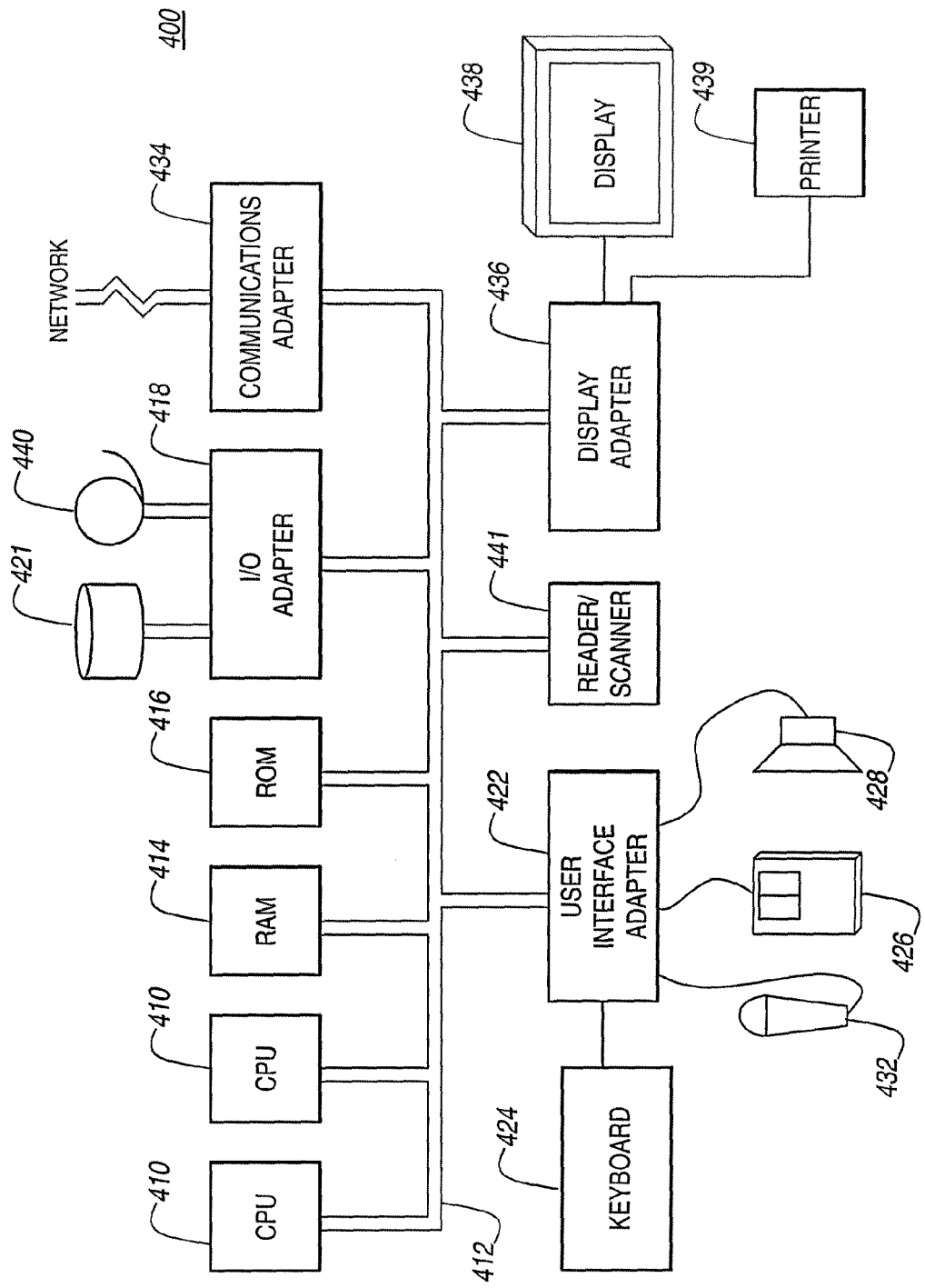
FIG. 12 illustrates a typical hardware configuration for implementing the exemplary embodiments of the present invention.
Figure 13:
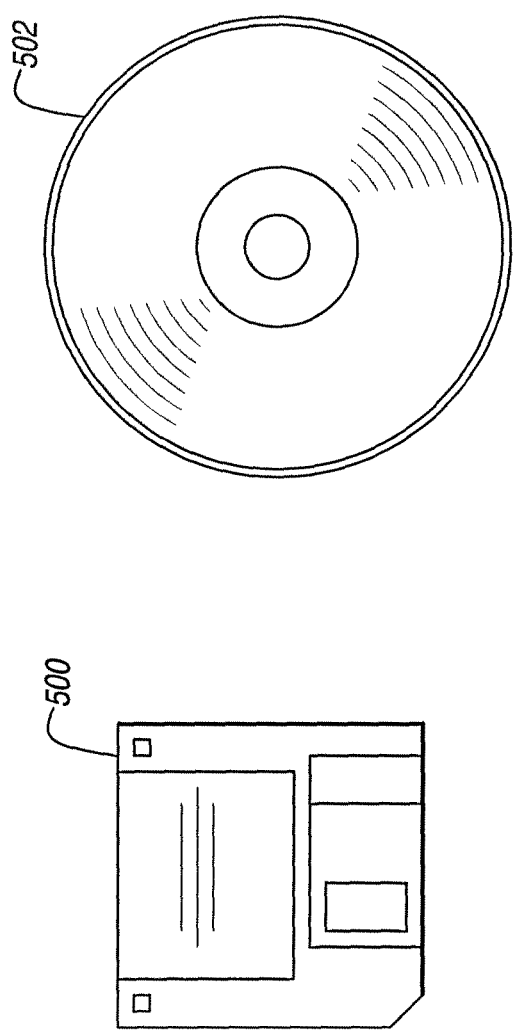
FIG. 13 illustrates several examples of storage media that may be used with the typical hardware configuration of FIG. 12.

FIG. 12 illustrates a typical hardware configuration 400 which may be used for implementing the inventive system and method of a multi-tiered approach to email prioritization described above. The configuration has preferably at least one processor or central processing unit (CPU) 410. The CPUs 410 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439. Further, an automated reader/scanner 441 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of storage media.

Thus, this aspect of the present invention is directed to a programmed product, including storage media tangibly embodying a program of machine-readable instructions executable by a digital data processor to perform the above method.

Such a method may be implemented, for example, by operating the CPU 410 to execute a sequence of machine-readable instructions. These instructions may reside in various types of storage media.

Thus, this aspect of the present invention is directed to a programmed product, including storage media tangibly embodying a program of machine-readable instructions executable by a digital data processor incorporating the CPU 410 and hardware above, to perform the method of the invention.

This storage media may include, for example, a RAM contained within the CPU 410, as represented by the fast-access storage for example. Alternatively, the instructions may be contained in another storage media, such as a magnetic data storage diskette 500 or compact disc 502 (FIG. 13), directly or indirectly accessible by the CPU 410.

Whether contained in the computer server/CPU 410, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable storage media. In an illustrative embodiment of the invention, the machine-readable instructions may comprise software object code, compiled from a language such as C, C++, etc.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of automating incoming message prioritization, the method comprising:
    training a global classifier using message-level contextual features computed from a plurality of e-mail messages and a priority level assigned to each of the plurality of e-mail messages;
    dynamically training a user-specific classifier using message-level contextual features computed from a plurality of feedback instances provided by a user regarding a priority level of previous incoming e-mail messages to the user;
    dynamically assessing a message-specific quality of the user-specific classifier by computing a vector similarity or distance between the vector of message-level contextual features of an incoming message against the vectors of message-level contextual features of the plurality of feedback instances provided by the user;
    selecting a priority classification strategy from a plurality of priority classification strategies based on the assessed quality of the user-specific classifier, the priority classification strategy using at least one of the global classifier and the user-specific classifier; and
    classifying the incoming message based on the selected priority classification strategy.

2. The method according to claim 1, wherein the plurality of priority classification strategies comprises a dynamic linear combination scheme with instance matching based on comparing the vector of the message-level contextual features of the incoming message and the vectors of the message-level contextual features of the plurality of feedback instances, the dynamic linear combination scheme with instance matching comprising:
    assessing a quality of the user-specific classifier; and
    assigning a weight to each of the global classifier and the user-specific classifier for a linear combination thereof, based on the assessed quality of the user-specific classifier.

3. The method according to claim 1, wherein the plurality of priority classification strategies comprises a dynamic linear combination scheme with instance matching, and
    wherein, when the incoming message and a feedback instance of the plurality of feedback instances have at least one of a same sender and subject, the dynamic linear combination scheme with instance matching assigns a same priority to the incoming message as a priority assigned to the feedback instance having at least one of the same sender and subject.

4. The method according to claim 3, wherein, when the incoming message does not have at least one of the same sender and subject as any of the plurality of feedback instances, the dynamic linear combination scheme with instance matching assigns a weight to each of the global classifier and the user-specific classifier for a linear combination thereof.

5. The method according to claim 1, further comprising:
    inferring a topic of the incoming message received by the computer system based on a topic model created from the interaction history between the user and the sender of this incoming message; and
    computing a message-level contextual feature of the incoming message based on the inferred topic of the incoming message.

6. The method according to claim 5, further comprising:
    calculating a first percentage of previously received messages that have a substantially similar topic as the inferred topic of the incoming message;
    calculating a second percentage of the previously received messages that have the substantially similar topic which are determined to have been read;
    calculating a third percentage of the previously received messages that have the substantially similar topic which are determined to have been at least one of forwarded, replied, saved, and flagged; and
    computing a contextual feature of the incoming message by dynamically combining the first percentage, the second percentage, and the third percentage.

7. The method according to claim 5, further comprising computing a plurality of message-level contextual features of the incoming message based on the inferred topic of the incoming message.

8. The method according to claim 5, further comprising computing a message centric feature of the plurality of message-level contextual features based on a percentage of received messages comprising a substantially similar topic as the inferred topic of the incoming message.

9. The method according to claim 1, wherein the plurality of priority classification strategies comprises a dynamic linear combination scheme with instance matching.

10. The method according to claim 9, wherein the dynamic linear combination scheme with instance matching includes assigning a weight to each of the global classifier and the user-specific classifier for a linear combination thereof, based on an assessed quality of the user-specific classifier.

11. The method according to claim 1, wherein the method is performed in an apparatus including an input to receive an incoming message, a processor, and a memory tangibly embodying a set of instructions executed by the processor to perform the automating of a prioritization of the incoming message.

12. A method of automating a prioritization of an incoming message, the method comprising:

creating a plurality of topic models for a user, each topic model to encode an interaction history that the user has with one of the user's e-mail contacts, and relationship data with the user and one of the user's e-mail contacts;

computing a plurality of message-level contextual features of a plurality of e-mail messages received by the user, based on a content of the messages and the interaction history, the topic models, and the relationship data;

training a global classifier using the plurality of message-level contextual features computed from the plurality of e-mail messages and a priority level assigned to each of the plurality of e-mail messages;

dynamically training a user-specific classifier with a plurality of feedback instances provided by a user regarding a priority level of previous incoming e-mail messages to the user;

dynamically assessing a message-specific quality of the user-specific classifier by comparing the vector of the message-level contextual features of an incoming message against the vectors of the message-level contextual features of the plurality of feedback instances provided by the user;

selecting a priority classification strategy from a plurality of priority classification strategies based on the assessed quality of the user-specific classifier, the priority classification strategy using at least one of the global classifier and the user-specific classifier; and classifying the incoming message based on the selected priority classification strategy.

13. A non-transitory tangible computer-readable medium embodying a program of machine-readable instructions executable by a digital processing apparatus to perform an instruction control method of automating a prioritization of an incoming message, the instruction control method comprising:

training a global classifier using message-level contextual features computed from a plurality of e-mail messages and a priority level assigned to each of the plurality of e-mail messages;

dynamically training a user-specific classifier using message-level contextual features computed from a plurality of feedback instances provided by a user regarding a priority level of previous incoming e-mail messages to the user;

dynamically assessing a message-specific quality of the user-specific classifier by computing a vector similarity or distance between the vector of message-level contextual features of an incoming message against the vectors of message-level contextual features of the plurality of feedback instances provided by the user;

selecting a priority classification strategy from a plurality of priority classification strategies based on the assessed quality of the user-specific classifier, the priority classification strategy using at least one of the global classifier and the user-specific classifier; and classifying the incoming message based on the selected priority classification strategy.

14. The non-transitory tangible computer-readable medium according to claim 13, wherein, when the similarity or distance is above or below a predetermined threshold, the user-specific classifier is assigned a weight that is greater than a weight assigned to the global classifier.

* * * * *